United States Patent

(12) United States Patent
Shigemura

(10) Patent No.: US 10,710,541 B2
(45) Date of Patent: Jul. 14, 2020

(54) AIRBAG DEVICE

(71) Applicant: TOYODA GOSEI CO., LTD., Kiyosu-shi, Aichi-ken (JP)

(72) Inventor: Takashi Shigemura, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 179 days.

(21) Appl. No.: 15/935,095

(22) Filed: Mar. 26, 2018

(65) Prior Publication Data
US 2018/0281735 A1 Oct. 4, 2018

(30) Foreign Application Priority Data

Mar. 30, 2017 (JP) .................. 2017-068791

(51) Int. Cl.
*B60R 21/217* (2011.01)
*B60R 21/237* (2006.01)
*B60R 21/206* (2011.01)
*B60R 21/231* (2011.01)

(52) U.S. Cl.
CPC ........ *B60R 21/2176* (2013.01); *B60R 21/206* (2013.01); *B60R 21/217* (2013.01); *B60R 21/237* (2013.01); *B60R 2021/2172* (2013.01); *B60R 2021/23169* (2013.01)

(58) Field of Classification Search
CPC . B60R 21/206; B60R 21/217; B60R 21/2171; B60R 21/2176; B60R 21/237; B60R 2021/0051; B60R 2021/2172; B60R 2021/23169
See application file for complete search history.

(56) References Cited

U.S. PATENT DOCUMENTS

| | | | | |
|---|---|---|---|---|
| 5,566,972 A * | 10/1996 | Yoshida | .............. | B60R 21/2171 280/728.2 |
| 7,055,858 B2 * | 6/2006 | Takimoto | .............. | B60R 21/217 280/743.1 |
| 7,226,077 B2 * | 6/2007 | Abe | ...................... | B60R 21/206 280/728.1 |
| 7,549,671 B2 * | 6/2009 | Mizuno | ................. | B60R 21/206 180/271 |

(Continued)

FOREIGN PATENT DOCUMENTS

| | | |
|---|---|---|
| JP | 2014-196063 | 10/2014 |
| JP | 2015-157529 | 9/2015 |

*Primary Examiner* — Laura Freedman
(74) *Attorney, Agent, or Firm* — Posz Law Group, PLC

(57) ABSTRACT

An airbag includes a body, an insert opening and a flap member which covers the insert opening from inside of the airbag. A retainer is inside the airbag, and an inflator is inserted into a holding section of the retainer via the insert opening such that the root end protrudes from the insert opening. The flap member entirely covers the insert opening of the airbag body as unfolded and is joined to the airbag body, with a continuous seam, by the circumferential edge except the leading edge disposed towards the leading end of the inflator. The flap member thus covers the holding section. The retainer includes an open region which exposes an outer periphery of the inflator towards the flap member, and the leading edge of the flap member is positioned to be pressed against the outer periphery of the inflator via the open region at airbag deployment.

3 Claims, 26 Drawing Sheets

(56) References Cited

U.S. PATENT DOCUMENTS

| | | | | |
|---|---|---|---|---|
| 7,604,250 | B2 * | 10/2009 | Hotta | B60R 21/206 |
| | | | | 280/728.2 |
| 7,850,196 | B2 * | 12/2010 | Kashiwagi | B60R 21/2171 |
| | | | | 280/728.1 |
| 8,047,570 | B2 * | 11/2011 | Feller | B60R 21/239 |
| | | | | 280/728.2 |
| 8,408,582 | B2 * | 4/2013 | Lunt | B60R 21/217 |
| | | | | 280/728.2 |
| 8,696,020 | B2 * | 4/2014 | Tanaka | B60R 21/233 |
| | | | | 280/728.2 |
| 9,290,148 | B2 * | 3/2016 | Hotta | B60R 21/2171 |
| 10,035,488 | B2 * | 7/2018 | Nagata | B60R 21/2171 |
| 10,086,788 | B2 * | 10/2018 | Ando | B60R 21/206 |
| 2008/0116669 | A1 * | 5/2008 | Adachi | B60R 21/203 |
| | | | | 280/730.1 |
| 2010/0201106 | A1 * | 8/2010 | Lisseman | B60R 21/206 |
| | | | | 280/730.1 |
| 2012/0074676 | A1 * | 3/2012 | Feller | B60R 21/213 |
| | | | | 280/730.2 |
| 2018/0281732 | A1 * | 10/2018 | Shigemura | B60R 21/233 |
| 2018/0281733 | A1 * | 10/2018 | Shigemura | B60R 21/2171 |
| 2018/0281734 | A1 * | 10/2018 | Shigemura | B60R 21/2171 |

* cited by examiner

FIG. 25
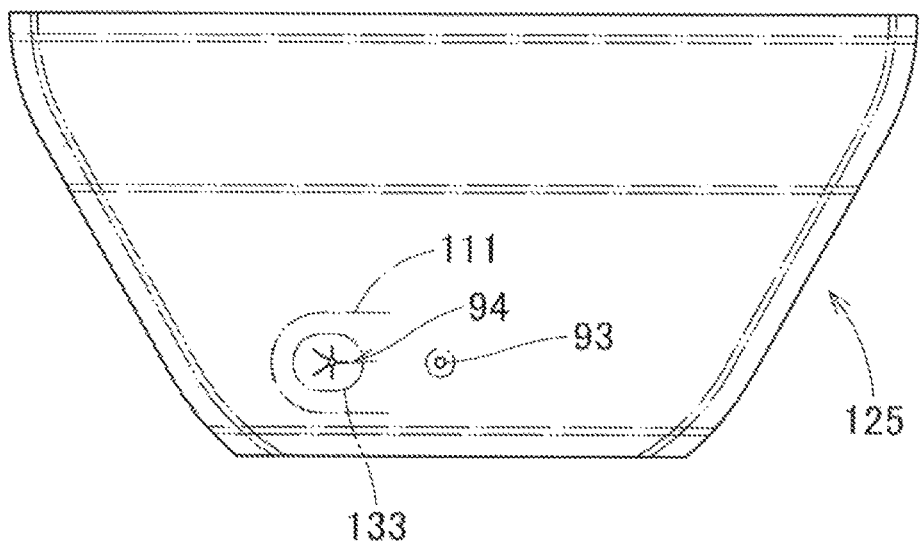
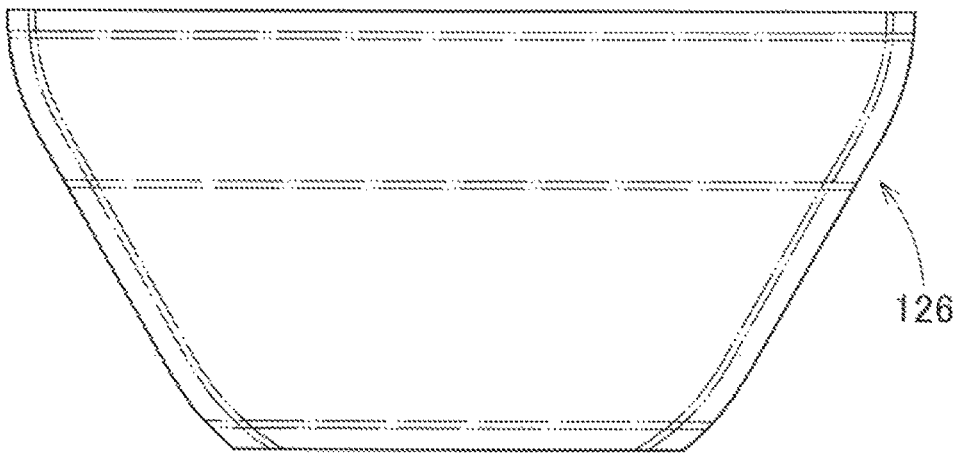

AIRBAG DEVICE

CROSS REFERENCE TO RELATED APPLICATIONS

The present application claims priority from Japanese Patent Application No. 2017-068791 of Shigemura, filed on Mar. 30, 2017, the entire disclosure of which is incorporated herein by reference.

BACKGROUND OF THE INVENTION

1. Field of the Invention

The present invention relates to an airbag device which includes an airbag formed of a base material having flexibility, an inflator for feeding the airbag with an inflation gas, and a retainer used to mount the airbag and inflator on the vehicle body structure.

2. Description of Related Art

JP 2014-196063 discloses a known airbag device which includes an airbag, an inflator for feeding the airbag with an inflation gas, and a retainer placed inside the airbag for holding the inflator. The inflator is inserted into the airbag via an insert opening of the airbag to be set in a holding section of the retainer such that the root end region of the inflator, which is to be connected to an actuation circuit, is placed outside of the airbag while the leading end region having gas release section is placed inside the airbag.

This airbag is internally provided with a seal tube which extends from a periphery of the insert opening. The retainer and inflator are inserted into the airbag via the seal tube. The retainer includes an open region. When the airbag device is mounted on board and the inflator is actuated, an inflation gas which flows into the airbag thrusts the seal tube into the open region of the retainer and presses the seal tube against the outer periphery of the inflator, thus the periphery of the insert opening is sealed.

Although the conventional airbag device described above is excellent in sealing property, it still has room for improvement in structure, because it is difficult to mount the seal tube to the periphery of the insert opening on the inner surface of the airbag.

SUMMARY OF THE INVENTION

An object of the present invention is to provide an airbag device for a vehicle that has a good sealing property of an insert opening of an airbag with a simple structure.

The airbag device of the invention includes an airbag that is inflatable with an inflation gas, an inflator that feeds the airbag with the inflation gas, and a retainer that mounts the airbag and the inflator on a vehicle body member.

The airbag includes a bag body that is formed of a base material having flexibility, an insert opening that is formed on the bag body, and a flap member that has a sheet shape and is disposed inside the bag body for covering the insert opening.

The inflator includes a leading end region provided with a gas release section and a root end region.

The retainer includes a holding section that is tubular in outer contour and holds the inflator therein, and a mounting means that protrudes out of a bottom region of the holding section. The retainer is placed inside the airbag with the mounting means protruded out of the airbag, and holds the inflator with the holding section such that the leading end region of the inflator is disposed inside the airbag whereas the root end region of the inflator protrudes from the insert opening of the airbag. The mounting means is adapted to be secured to the vehicle body member in order to mount the airbag and the inflator on the vehicle body member.

The flap member is arranged to entirely cover the insert opening of the bag body as flatly unfolded. The flap member includes a leading edge which is disposed towards the leading end region of the inflator, and is joined to the bag body, with a continuous seam, by the circumferential edge except the leading edge. The flap member covers the inflator as held by the holding section of the retainer.

The holding section of the retainer includes:

an opening-side tube section that is disposed in a vicinity of the insert opening of the airbag and that extends from the bottom region of the holding section and holds the inflator therein; and an open region that is formed at an area of a periphery of the opening-side tube section distant from the bottom region of the holding section, and that exposes an outer periphery of the inflator as set in the opening-side tube section towards the flap member.

The leading edge of the flap member is located at a position to be pressed against the outer periphery of the inflator via the open region of the retainer at airbag deployment.

In the airbag device of the invention, the flap member disposed inside of the bag body covers the insert opening of the airbag entirely. The flap member is joined to the bag body by the circumferential edge except the leading edge disposed towards the leading end region of the inflator provided with the gas release section. That is, the flap member forms a pocket with the leading edge unsewn. At airbag deployment, this configuration will make it difficult for an inflation gas to flow into a space between the bag body and the flap member which covers the holding section, and will prevent the flap member from floating with the gas. Accordingly, the pressure of the inflation gas (or the internal pressure of the bag body) will press the flap member against the outer periphery of the inflator via the open region of the retainer smoothly. Moreover, the airbag device of the invention is configured such that the leading edge of the flap member, which is not sewn to the bag body, is formed at a position to be pressed against the outer periphery of the inflator via the open region of the retainer at airbag deployment. Therefore, the leading edge of the flap member will be brought into close contact with the outer periphery of the inflator to ensure gas tightness, such that a gas leakage from the insert opening will be prevented. Further, the airbag device of the invention is simple in configuration and can be manufactured with reduced cost in comparison with conventional airbag devices, since the flap member, which has a sheet-shape, is merely joined to the bag body by the circumferential edge, in the circumference of the insert opening of the airbag.

Therefore, the airbag device of the invention provides a good sealing property of the insert opening of the airbag with a simple structure.

In the airbag device of the invention, it is desired that the insert opening of the airbag is composed of at least one slit, and that the retainer includes a retaining pawl that is formed at an end of the opening-side tube section disposed towards the insert opening of the airbag, and that protrudes from the slit and is disposed outside of the bag body in order to be engaged with a periphery of the insert opening.

With this configuration, an area around the slit(s) covers the outer periphery of the inflator as set inside the airbag, which enhances the sealing property. Moreover, the retaining pawl which is engaged with the periphery of the insert opening assists with alignment of the positions of the insert opening of the airbag and the holding section of the retainer at an inserting work of the inflator. Furthermore, the engagement of the retaining pawl with the periphery of the insert opening will also help with steady positioning of the flap member with respect to the holding section.

In the airbag device of the invention, it is further desired that the seam which connects the flap member to the bag body is formed in such a manner that an unsewn region is left between the leading edge of the flap member and a terminal of the seam disposed towards the leading edge, and in such a manner that a position of the terminal in an axial direction of the inflator falls within an area of the open region of the retainer. This configuration allows for a certain ease at the leading edge of the flap member and facilitates an inserting work of the inflator when inserting the inflator into the airbag via the insert opening. This configuration will also provide the leading edge of the flap member with greater flexibility in movement with respect to the bag body in comparison with an instance where the seam extends to the leading edge. Accordingly, the leading edge of the flap member will be further adequately brought into close contact with the outer periphery of the inflator when subjected to a pressure of the inflation gas.

BRIEF DESCRIPTION OF DRAWINGS

FIGS. 25 and 26 depict base materials of the airbag of FIG. 18 by plan views;

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
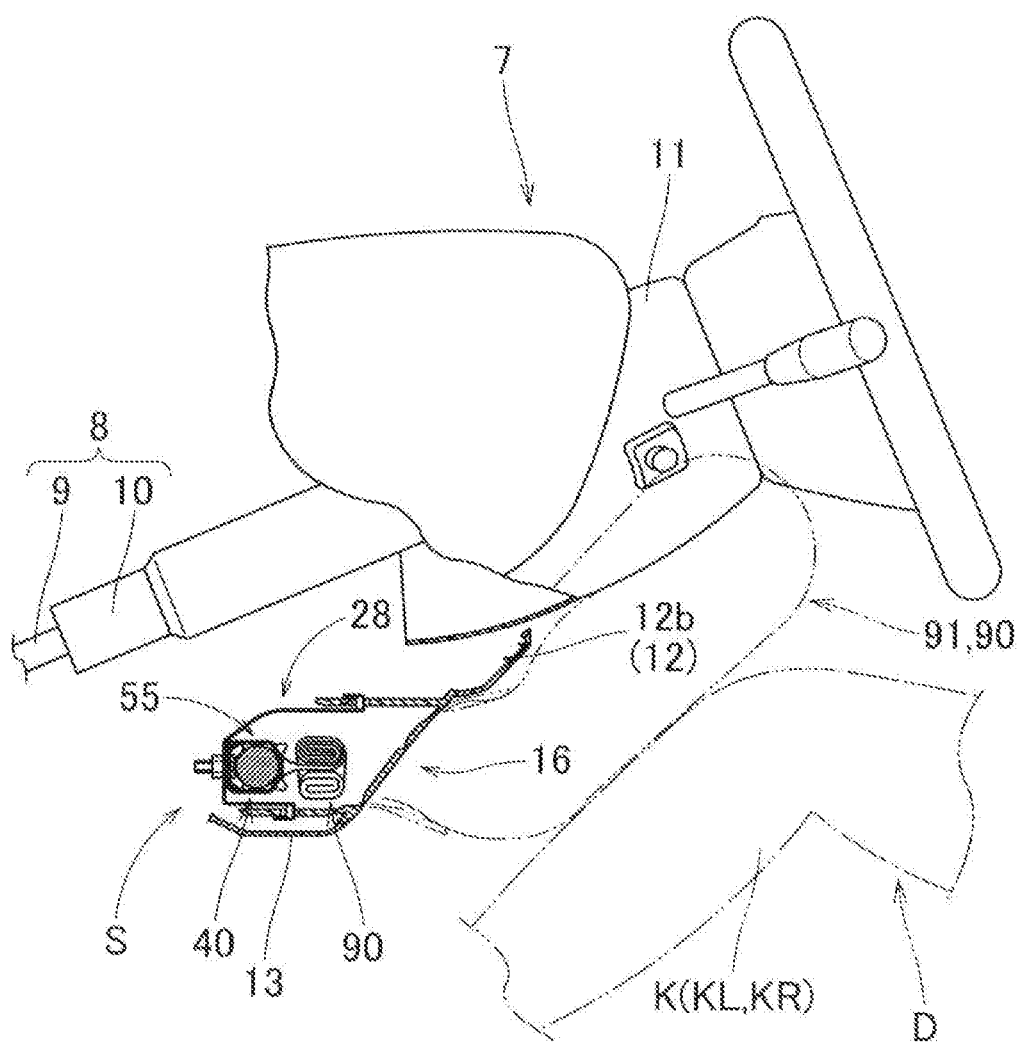
FIG. 1 is a schematic vertical sectional view of a knee-protecting airbag device embodying the invention as mounted on a vehicle and actuated, taken along a front and rear direction of the vehicle.
Figure 4:
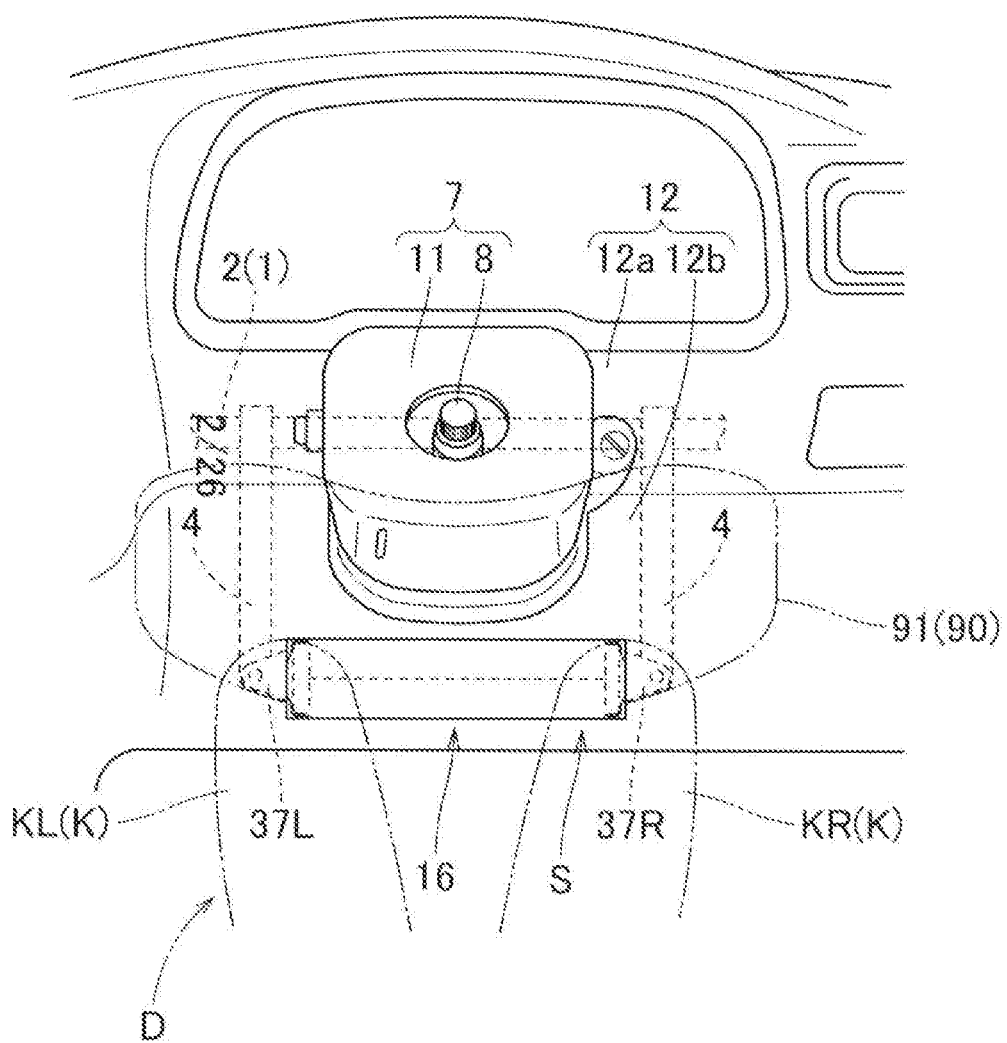
FIG. 4 is a schematic front view of the airbag device of FIG. 1 as actuated, viewed from the rear.

As shown in FIGS. 1 and 4, an airbag device S embodying the invention is mounted beneath a steering column 7, in front of a driver's seat of a vehicle, as a knee-protecting airbag device for protecting knees K (KL and KR) of a driver (as an occupant) D. Unless otherwise specified, up/down, left/right and front/rear directions in this specification are intended to refer to up/down, left/right and front/rear directions of the vehicle.

As shown in FIGS. 1 and 4, the steering column 7 includes a column body 8 and a column cover 11 which covers an outer periphery of the column body 8. As shown in FIG. 1, the column body 8 includes a main shaft 9 and a column tube 10 which covers the main shaft 9.

Figure 2:
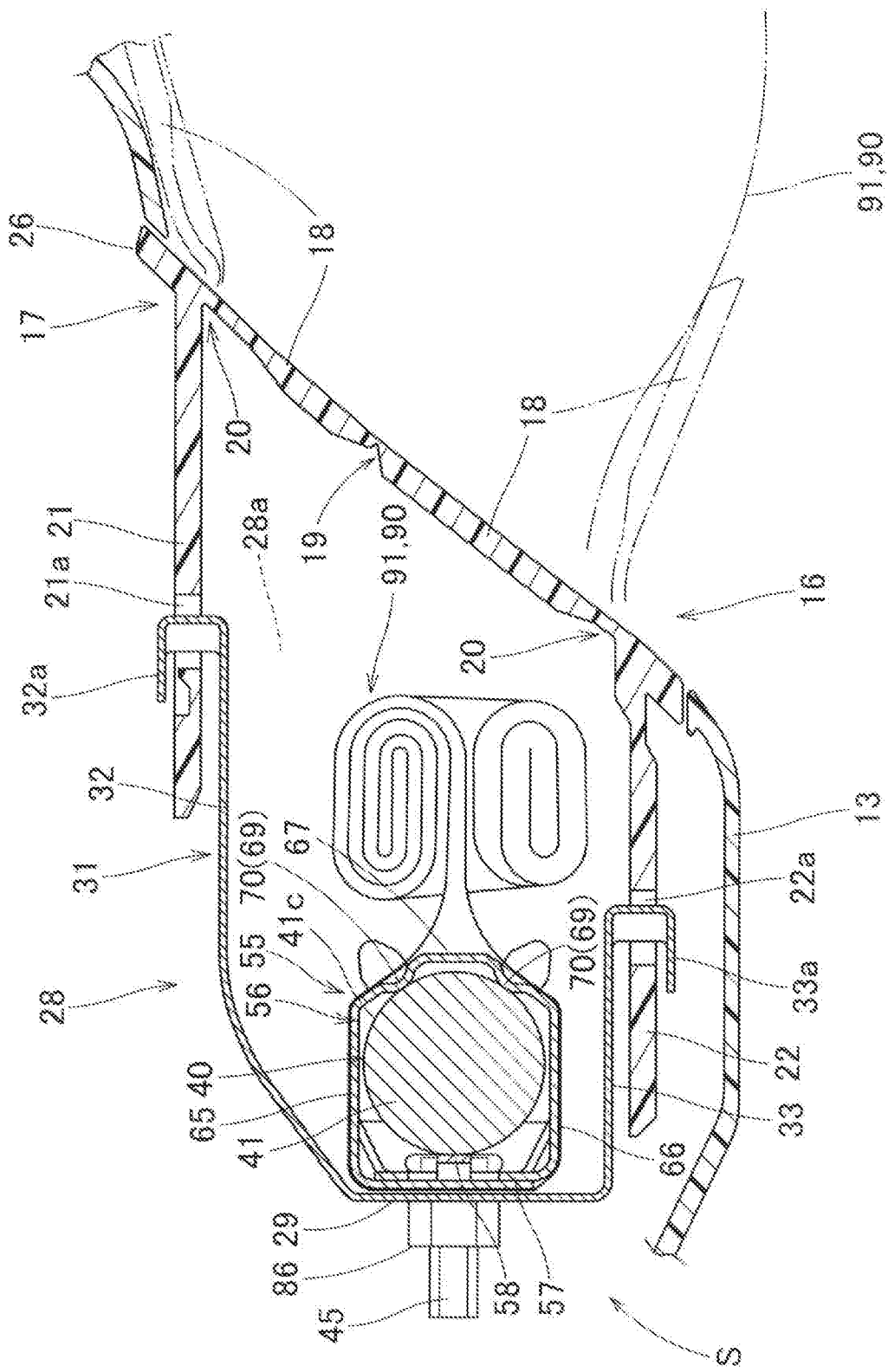
FIG. 2 is a schematic enlarged vertical sectional view of the airbag device of FIG. 1 taken along a front and rear direction of the vehicle.
Figure 3:
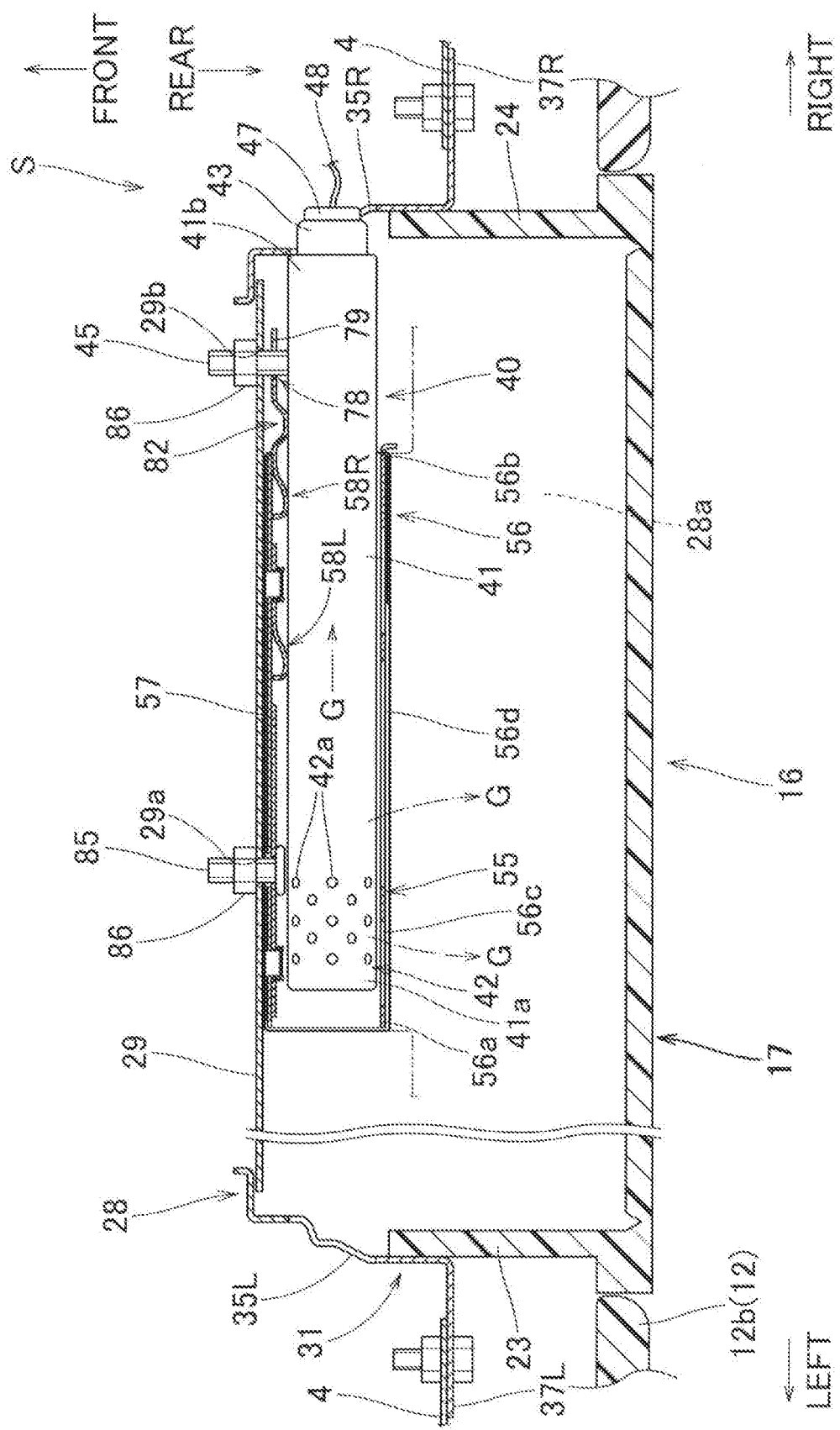
FIG. 3 is a schematic horizontal sectional view of the airbag device of FIG. 1 taken along a left and right direction.

As shown in FIGS. 1 to 3, the airbag device S includes an airbag 90, which is in a folded-up configuration, an inflator 40 for feeding the airbag 90 with an inflation gas, a case (vehicle body member) 28 for storing the airbag 90 and inflator 40, a retainer 55 which is used to mount the airbag 90 and inflator 40 on the case 28, and an airbag cover 16 for covering the rear side of the airbag 90.

The airbag cover 16 is fabricated of thermoplastic elastomer (TPO) of polyolefin and covers the rear side of the case 28. As shown in FIGS. 1 to 4, the airbag cover 16 is disposed in a lower panel 12b of an instrument panel (which will hereinafter be called dashboard) 12 which is composed of an upper panel 12a and lower panel 12b. The airbag cover 16 includes a door-forming region 17 which is disposed in a vicinity of a later-described emergence opening 28a of the case 28, and a peripheral region 26 disposed around the door-forming region 17.

Referring to FIGS. 2 and 3, the door-forming region 17 includes a door (double door) 18, mounting regions 21 and 22 which extend forward from upper and lower end portions of the door 18 for joint with the case 28, and side walls 23 and 24 which extend forward from left and right end portions of the door 18. The door 18 is disposed at the rear of the emergence opening 28a and formed into a generally rectangular plate. In the illustrated embodiment, the door 18 is provided with a thinned breakable region 19 which is formed generally into H as viewed from the rear so as to be openable upward and downward about hinges 20 which are disposed at upper and lower ends of the door 18. Each of the mounting regions 21 and 22 extends forward so as to adjoin a later-described upper wall 32/lower wall 33 of the case 28 on the outside, and is provided, at the front end, with a plurality of rectangular retaining holes 21a/22a for engagement with later-described hooks 32a/33a of the case 28. The retaining holes 21a and 22a are formed along a left and right direction. The side walls 23 and 24 extend forward and adjoin later-described left wall 34L and right wall 34R of the case 28 on the inner side.

The peripheral region 26 of the airbag cover 16 is disposed around the door-forming region 17. As shown in FIGS. 2 and 3, the peripheral region 26 of the illustrated embodiment extends outwardly from the door 18 such that the rear surface is generally flush with the door 18.

Figure 5:
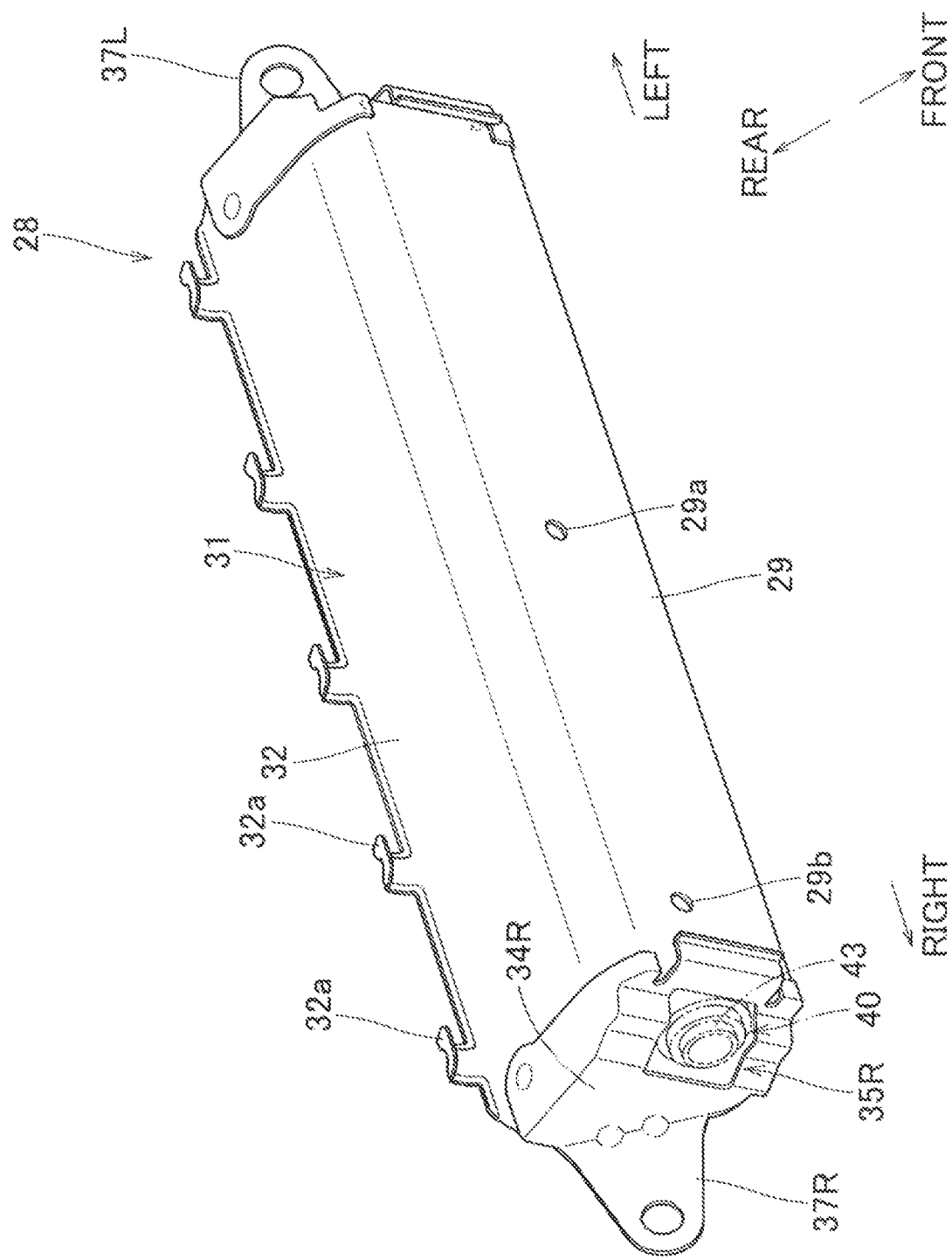
FIG. 5 is a perspective view of a case for use in the airbag device of FIG. 1, viewed from the front.

The case 28 is made of sheet metal. As shown in FIGS. 2, 3 and 5, the case 28 of the illustrated embodiment is formed generally into such a box that includes a generally square bottom wall 29, which is adapted to face forward when mounted on the vehicle, a generally square tubular circumferential wall 31 which extends rearward from the circumferential edge of the bottom wall 29, and an emergence opening 28a via which the airbag 90 emerges out of the case 28 for deployment.

The bottom wall 29 is formed into a generally rectangle elongated in a left and rear direction. The bottom wall 29 includes an aperture 29a for receiving a bolt (mounting means) 85 of the retainer 55 and an aperture 29b for receiving a bolt 45 of the inflator 40 at spaced-apart positions in a left and right direction. In the illustrated embodiment, the bottom wall 29 of the case 28 serves as a vehicle body member on which the inflator 40 and airbag 90 are mounted.

The circumferential wall 31 includes an upper wall 32 and a lower wall 33 which are opposed in an up and down direction and a left side wall 34L and a right side wall 34R which are opposed in a left and right direction. Each of the upper wall 32 and lower wall 33 is provided with a plurality of hooks 32a/33a for engagement with the peripheries of the retaining holes 21a/22a of the mounting regions 21/22 of the airbag cover 16. Each of the hooks 32a and 33a protrudes outwardly and is so bent that the leading end faces towards the front, thus having a generally L shaped sectional shape. In the illustrated embodiment, the upper wall 32 and lower wall 33 are provided with five hooks 32a/33a each, lined up in a left and right direction.

In the illustrated embodiment, the left side wall 34L and right side wall 34R are formed into bilaterally symmetric contours. The right side wall 34R, as a representative of both, will be described in detail below.

The right side wall 34R has such a stepped contour that the front region, which adjoins the bottom wall 29, is disposed farther inward (or towards the left) than the rear region, which adjoins the emergence opening 28a. As shown in FIG. 5, the right side wall 34R is provided with a through opening 35R which is rectangular as viewed from the left or right side. The through opening 35R allows a later-described connection port 43 of the inflator 40 as set in the case 28 to be exposed for connection with a connector 47.

As shown in FIGS. 3 and 5, the case 28 of the illustrated embodiment further includes a pair of mounting sections 37L and 37R each of which extends outwardly in a left and right direction from the rear edge of the left side wall 34L/right side wall 34R. The mounting sections 37L and 37R are used to mount the case 28 on the vehicle body structure 1. As shown in FIGS. 3 and 4, the mounting sections 37L and 37R are jointed to brackets 4 extending from the dashboard reinforcement 2, part of the vehicle body 1, at the front side of the lower panel 12b of the dashboard 12.

As shown in FIG. 3, the inflator 40 of the illustrated embodiment includes a generally cylindrical body 41 and a bolt 45 which protrudes out of the body 41. The inflator body 41 is adapted to be disposed along a left and right direction of the vehicle, and includes a gas release section 42 at the left end 41a region (i.e. at the leading end region). As shown in FIG. 3, the gas release section 42 includes numerous gas discharge ports 42a which are arranged in a radially interspaced fashion, in more than one rows. At the right end (root end) 41b of the inflator body 41, there is provided a connection port 43 for joint with a connector 47 to which lead wires 48 are connected for feeding an actuating signal. The bolt 45 protrudes out of the right end 41b region of the inflator body 41 generally orthogonally to the axis of the inflator body 41. More specifically, the bolt 45 is disposed at an approximately one-fifth position of the length of the inflator body 41 from the end face of the right end 41b.

Figure 6:
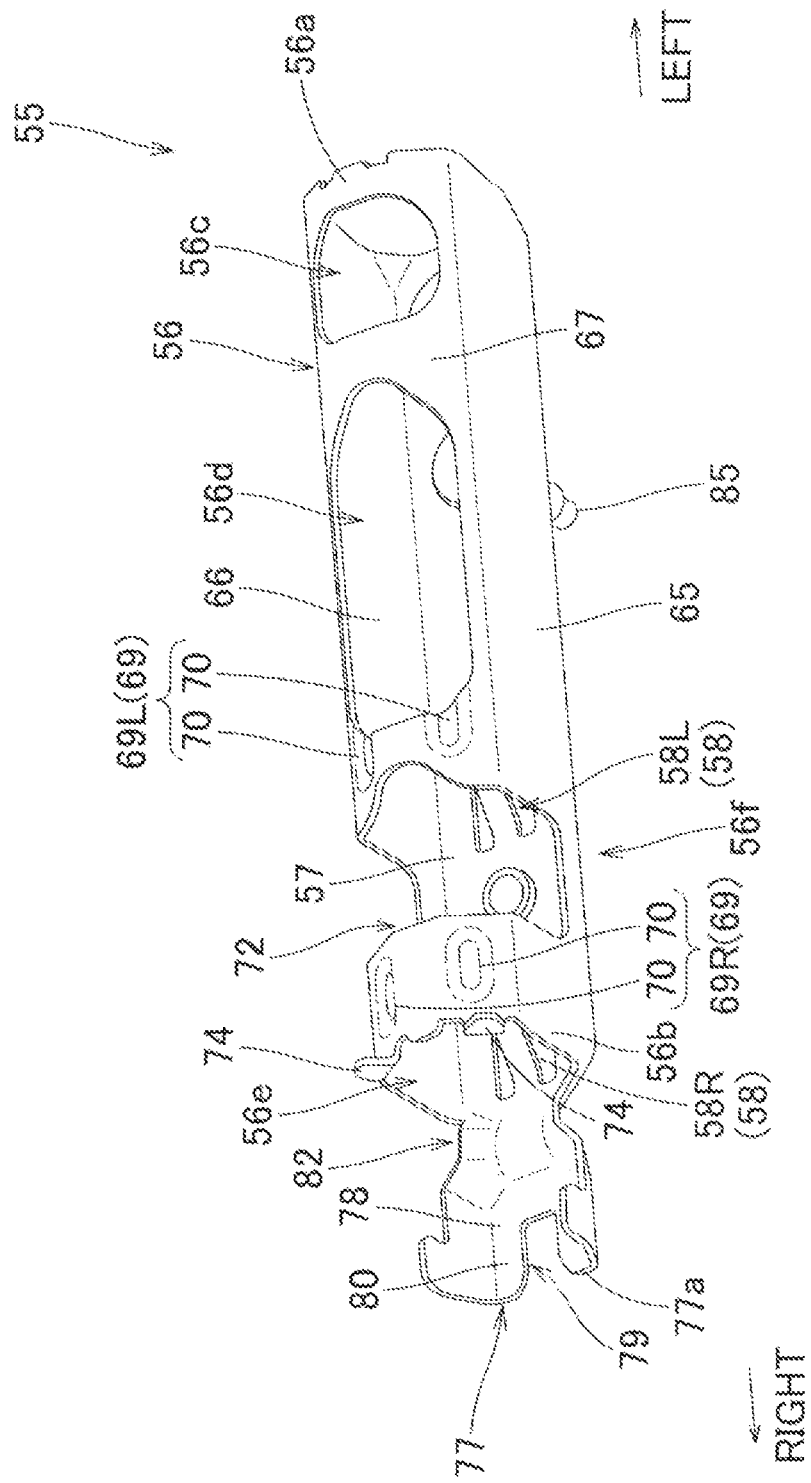
FIG. 6 is a perspective view of a retainer for use in the airbag device of FIG. 1, viewed from the rear.
Figure 7:
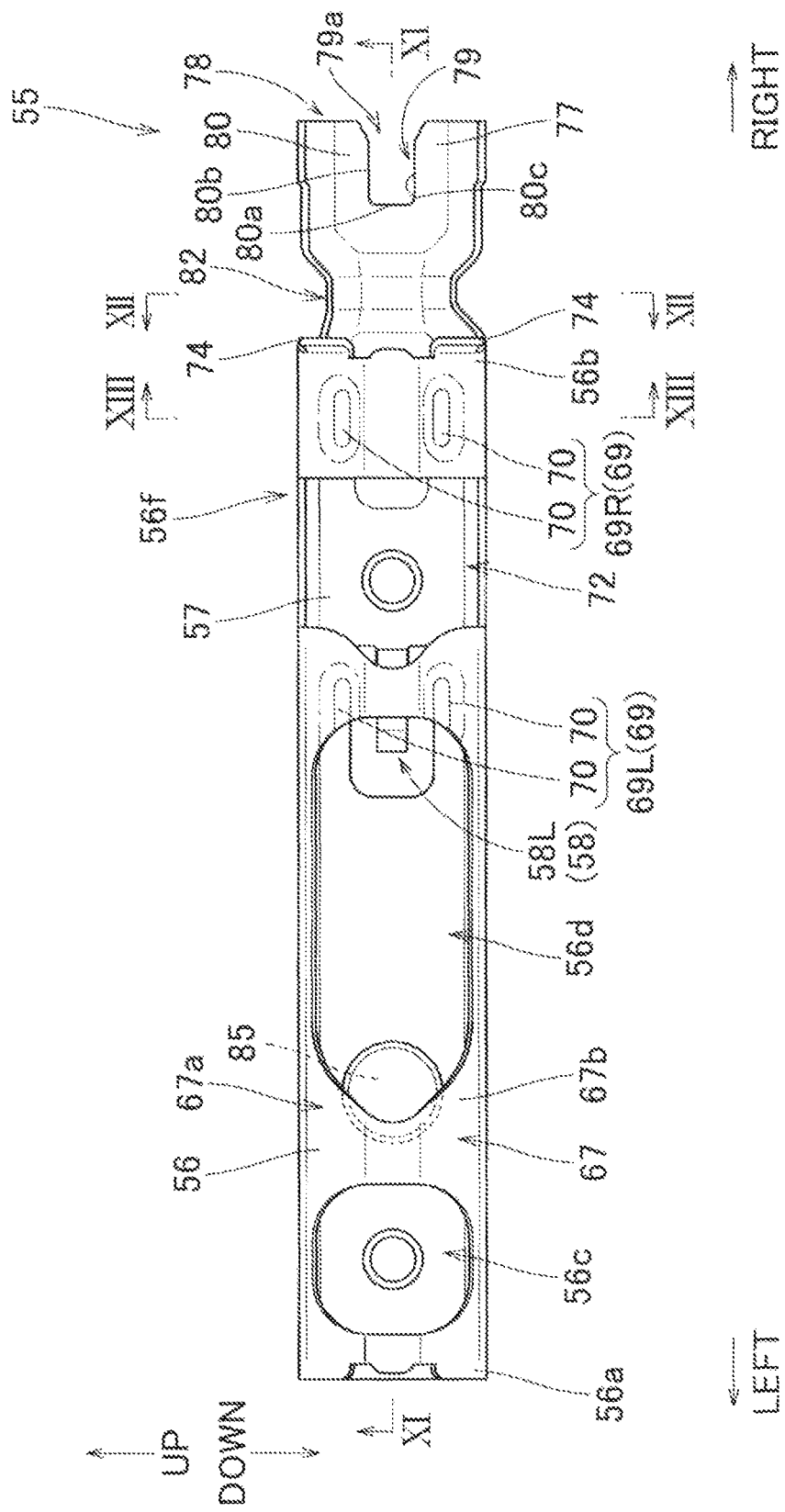
FIG. 7 is a front view of the retainer of FIG. 6 viewed from the rear.
Figure 8:
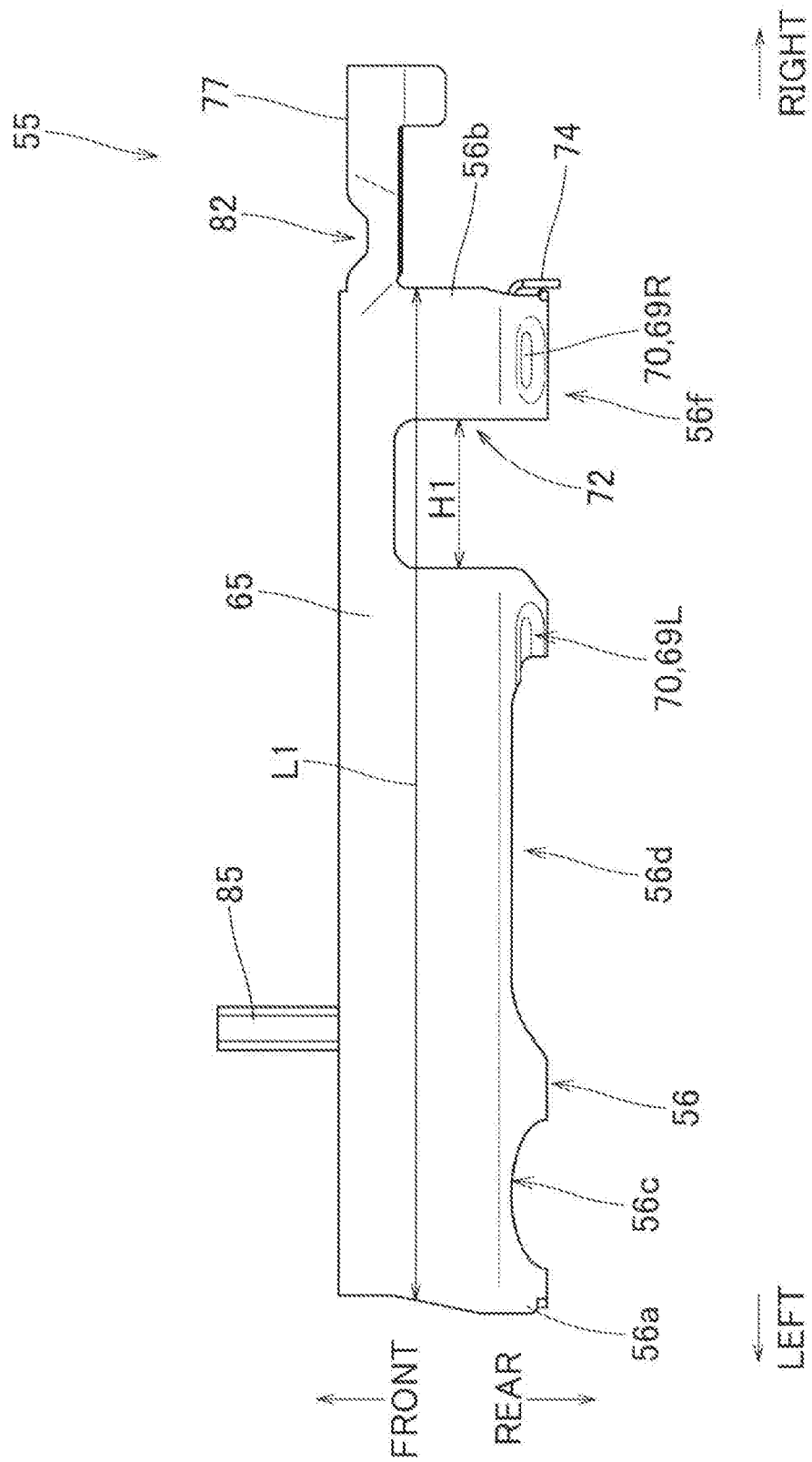
FIG. 8 is a plan view of the retainer of FIG. 6.

Referring to FIGS. 6 to 8, the retainer 55 includes a generally tubular holding section 56 which covers an outer periphery of the inflator 40 and supports the inflator 40, a bolt (mounting means) 85 which protrudes out of a later-described bottom wall 57 of the holding section 56, a storing cove section 78 for receiving the bolt 45 of the inflator body 41, and a pressing section 82 which is pressed against the outer periphery of the inflator body 41 when mounted on board. In the illustrated embodiment, the members of the retainer 55 except the bolt 85 (i.e. the holding section 56, later-described extended region 77 for forming the storing cove section 78 and the pressing section 82) are integral and formed of a sheet metal.

Referring to FIGS. 6 to 11, the holding section 56 is formed into a generally square tubular contour elongated in a left and right direction, and are open at both left and right ends. The holding section 56 includes a bottom wall 57 which is disposed generally along the bottom wall 29 of the case 28, an upper wall 65 which extends rearward from a vicinity of the upper edge of the bottom wall 57 and covers the upper side of the inflator body 41, a lower wall 66 which extends rearward from a vicinity of the lower edge of the bottom wall 57 and covers the lower side of the inflator body 41, and a rear wall 67 which connects the rear ends of the upper wall 65 and lower wall 66 and covers the rear side of the inflator body 41. More particularly, the rear wall 67 includes, at the upper area and lower area, an upper sloping region 67a and a lower sloping region 67b which are formed in such a manner as to chamfer the corners of the holding section 56. The holding section 56 further includes an outlet opening 56c and an outlet opening 56d for releasing an inflation gas emitted out of the gas release section 42 of the inflator body 41 into the airbag 90. Each of the outlet openings 56c and 56d is formed by cutting out a portion of a left end 56a region of the holding section 56 which covers the rear side of the gas release section 42 of the inflator 40 (i.e. a portion of the rear wall 67). Another opening formed at the right end 56b region of the holding section 56 serves as an insert opening 56e via which the inflator body 41 is inserted, from the gas release section 42. In the illustrated embodiment, moreover, a region to the right end 56b of the holding section 56, in other words, a region in a vicinity of the insert opening 56e, constitutes an opening-side tube section 56f disposed in a vicinity of a later-described insert opening 94 of the airbag 90. More particularly, the opening-side tube section 56f of the illustrated embodiment is composed of a right half region of the holding section 56.

Figure 11:
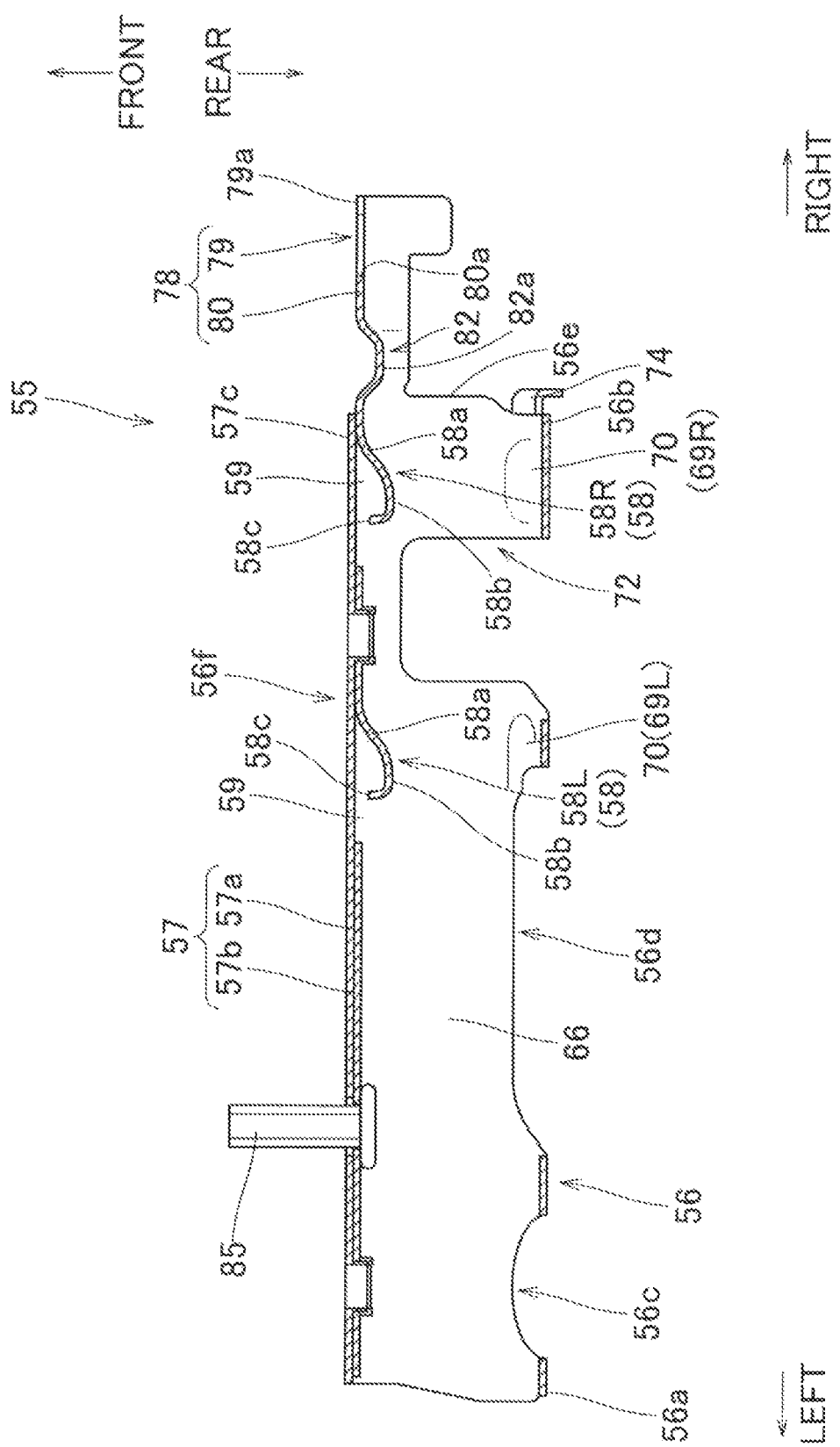
FIG. 11 is a sectional view of the retainer taken along line XI-XI of FIG. 7.
Figure 13:
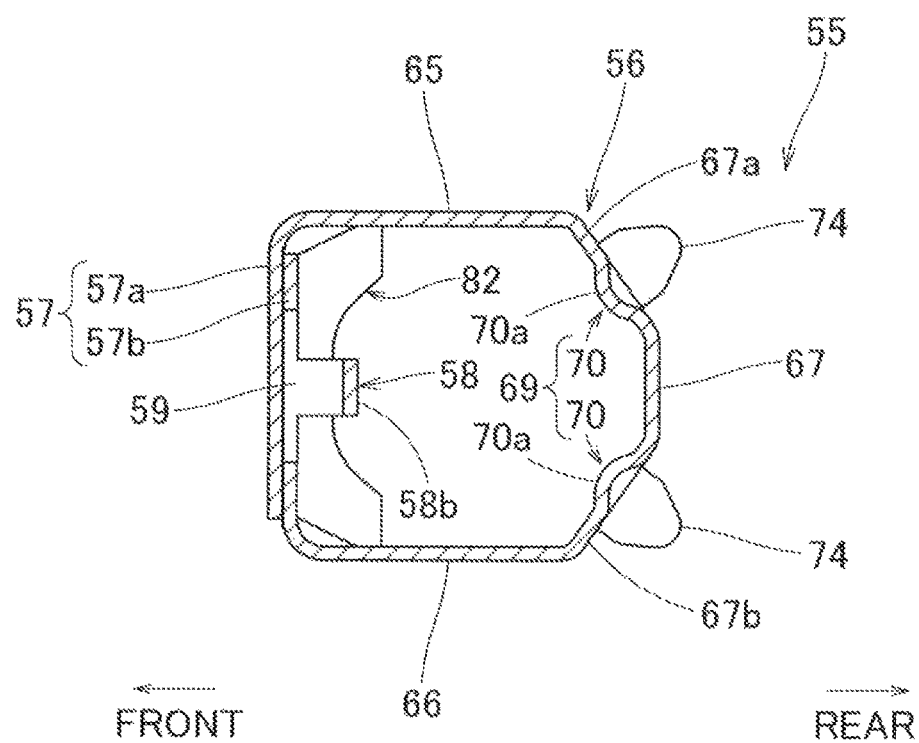
FIG. 13 is an enlarged sectional view of the retainer taken along line XIII-XIII of FIG. 7.

As shown in FIGS. 2 and 3, the bottom wall 57 is formed into a flat plate elongated in a left and right direction. In the illustrated embodiment, the members of the retainer 55 except the bolt 85 (i.e. the holding section 56, the extended region 77 for forming the storing cove section 78 and the pressing section 82) are formed of a sheet metal as described above. The sheet metal is formed into a predetermined shape by pressing or the like, and then the opposite edges of the sheet metal are lapped and jointed by suitable clinching technique at the bottom wall 57. Thus the bottom wall 57 has a double-wall structure of an outer region 57a and an inner region 57b, as shown in FIGS. 11 and 13.

Figure 10:
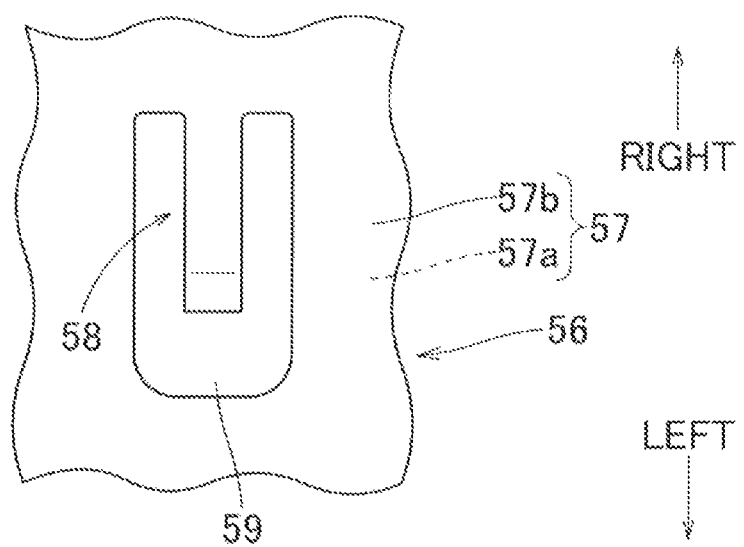
FIG. 10 is a partial enlarged view of an elastically deformable support region of the retainer of FIG. 6.
Figure 14:
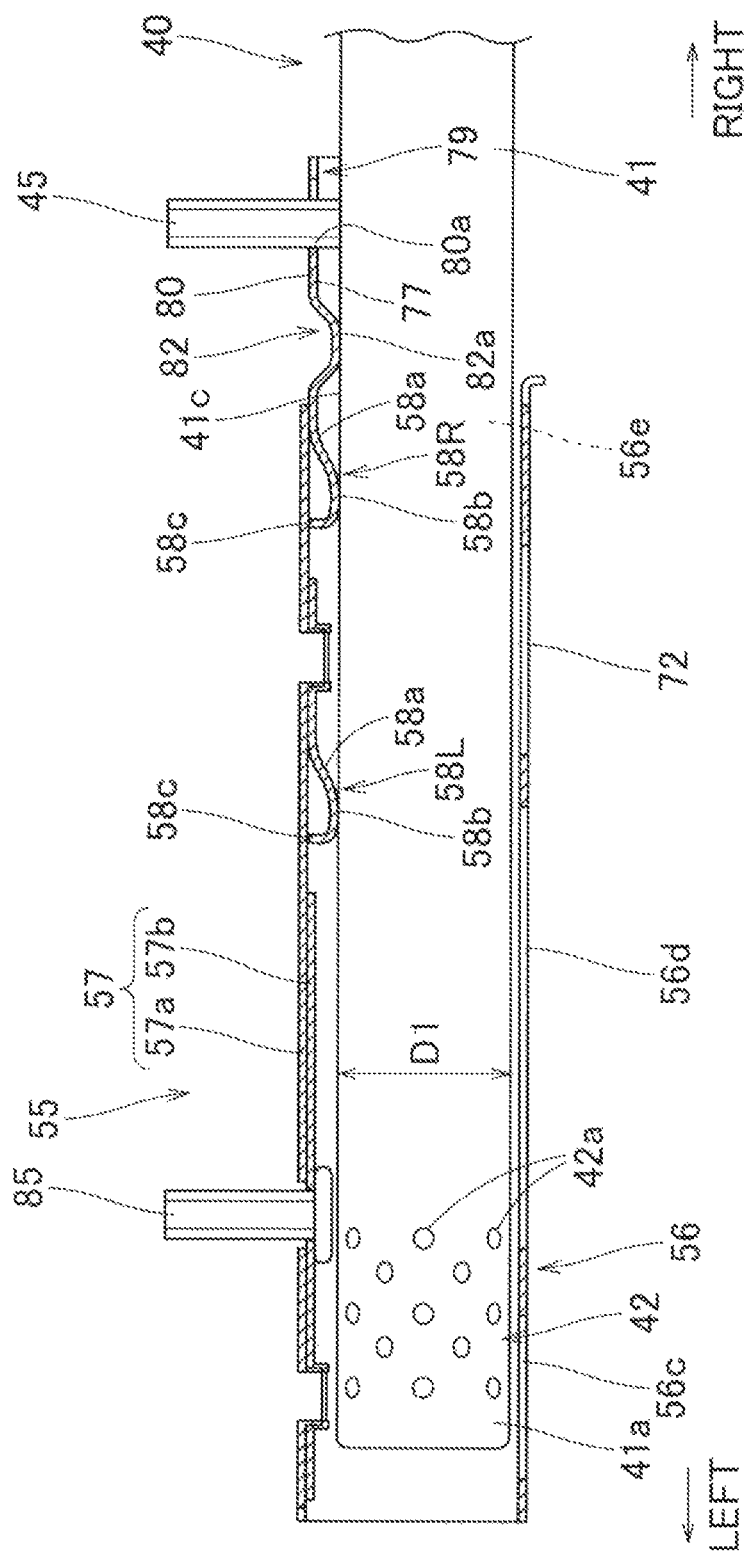
FIG. 14 is a cross sectional view of the retainer as mounted on an inflator.

The bottom wall 57 includes an elastically deformable support region 58 which is to elastically deform and abut against the outer periphery 41c of the inflator body 41 when the inflator body 41 is inserted into the holding section 56. The elastically deformable support region 58 is formed into a band extending generally along a left and right direction. As shown in FIGS. 10 and 11, the right end (or root end) of the elastically deformable support region 58, which is closer to the insert opening 56e, is continuous with the bottom wall 57, while the leading end 58c is separated from the bottom wall 57. More specifically, the elastically deformable support region 58 extends obliquely inwardly (i.e. towards the rear, as mounted on board) towards the left, and is bent forward at the leading end 58c, thus having a J-like curving sectional shape. That is, the elastically deformable support region 58 includes a sloping region 58a, which is composed of the root region, the leading end region 58c, and a support body 58b which is disposed between the sloping region 58a and the leading end region 58c and curved generally in an arcuate shape and protrudes inwardly. The elastically deformable support region 58 is designed to bend at the sloping region 58a and abut against the outer periphery 41c of the inflator body 41 by the support body 58b when the inflator body 41 is set in the holding section 56, as shown in FIG. 14. The elastically deformable support region 58 is formed by clipping a portion of the inner region 57b of the double-wall bottom wall 57. The clipping provides an opening 59 in the inner region, but this opening 59 is wholly closed off by the outer region 57a of the bottom wall 57, as shown in FIGS. 11 and 13.

A protruding amount of the support body 58b of elastically deformable support region 58 from the bottom wall 57 is such as to make the sloping region 58a bend or elastically deform and make the support body 58b abut against the outer periphery 41c of the inflator body 41 when the inflator body 41 is set in the holding section 56, as shown in FIG. 14. More particularly, the protruding amount of the support body 58b is determined such that the inflator body 41 is held by the support body 58b and leading ends of later-described supporting projections 70, with the sloping region 58a kept bent (or elastically deformed), and prevented from moving in the axial direction with respect to the holding section 56 when the inflator body 41 is set in the holding section 56. As shown in FIG. 11, the leading end 58c of the elastically deformable support region 58 is located at a distance from the outer region 57a of the bottom wall 57 for allowing elastic deformation of the support region 58 (FIG. 14). Further, the sloping region 58a of the elastically deformable support region 58 is configured to protrude obliquely inwardly towards the left (i.e. towards a direction away from the insert opening 56e) so as to assist with smooth insertion of the inflator body 41 into the holding section 56 via the insert opening 56e.

The elastically deformable support region 58 holds the inflator body 41 as inserted into the retainer 55 in cooperation with a later-described butt region 69 (or supporting projection 70). As shown in FIGS. 7, 11 and 13, the support region 58 of the illustrated embodiment is disposed generally at the same position in a left and right direction (in an axial direction of the inflator 40) as the butt region 69 (or supporting projection 70), and at an opposite position to the butt region 69 (or supporting projection 70) in a front and rear direction. Moreover, the retainer 55 of the illustrated embodiment includes two such elastically deformable support regions 58L and 58R. Both of the elastically deformable support regions 58L and 58R are disposed to the right side of the center in a left and right direction of the bottom wall 57, interspatially in a left and right direction. That is, in the illustrated embodiment, the elastically deformable support regions 58L and 58R are disposed in the opening-side tube section 56f in the holding section 56. More particularly, the support region 58R, which is located farther to the right side, is disposed in a vicinity of the right end 56b of the holding section 56, in other words, in a vicinity of the insert opening 56e or in a vicinity of and on the left of the pressing section 82.

The rear wall 67 of the holding section 56 includes a butt region 69 which abuts against the outer periphery 41c of the inflator body 41 as inserted through the holding section 56. The rear wall 67 of the illustrated embodiment includes two such butt regions 69L and 69R, which are disposed interspatially in a left and right direction. As shown in FIGS. 6, 7, 11 and 13, each of the butt regions 69L and 69R is disposed generally at the same position in the left and right direction (in the axial direction of the inflator 40) as the elastically deformable support region 58L/58R, opposite to the support region 58L/58R in the front and rear direction. That is, the butt region 69 and elastically deformable support region 58 are disposed on the same circumferential position about the axis of the inflator body 41 when the retainer 55 holds the inflator body 41. As shown in FIG. 13, in a sectional view taken along a front and rear direction, each of the butt regions 69L and 69R includes two supporting projections 70 which are disposed spaced-apart in a circumferential direction (in an up and down direction). Each of the supporting projections 70 is formed by denting each of the upper sloping region 67a and lower sloping region 67b of the rear wall 67 inwardly (i.e. towards the inflator body 41, or towards the front). The supporting projections 70 have higher rigidity than the elastically deformable support regions 58. The leading end 70a region of each of the supporting projections 70 is formed into a generally arcuate curve, and butts the outer periphery 41c of the inflator body 41. That is, in the illustrated embodiment, the elastically deformable support region 58 and two supporting projections 70 are arranged at the same circumferential position of the inflator body 41, generally radially about the axis of the inflator body 41.

Figure 30:
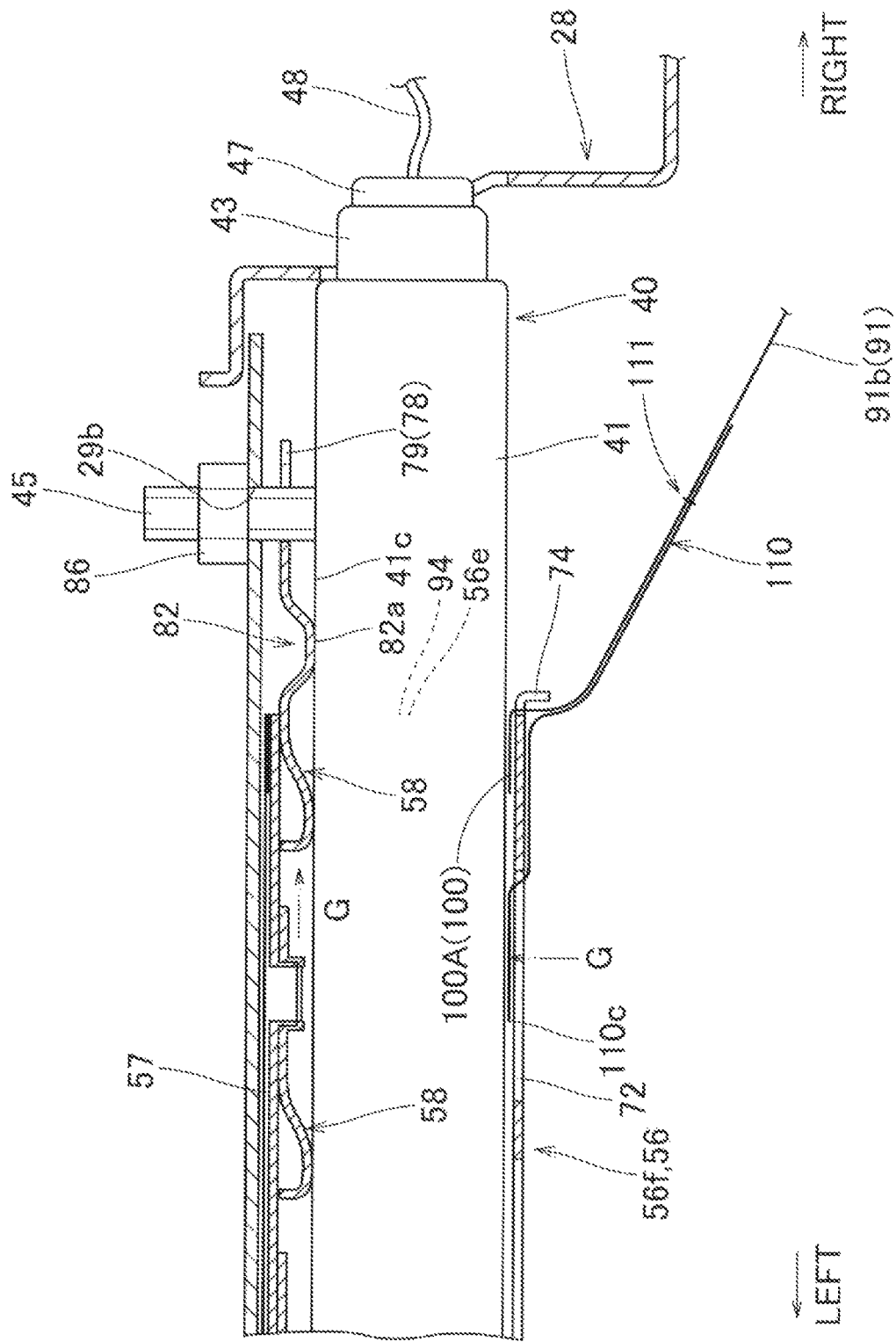
FIG. 30 is a partial enlarged horizontal sectional view of the airbag device of the illustrated embodiment at airbag deployment.
Figure 31:
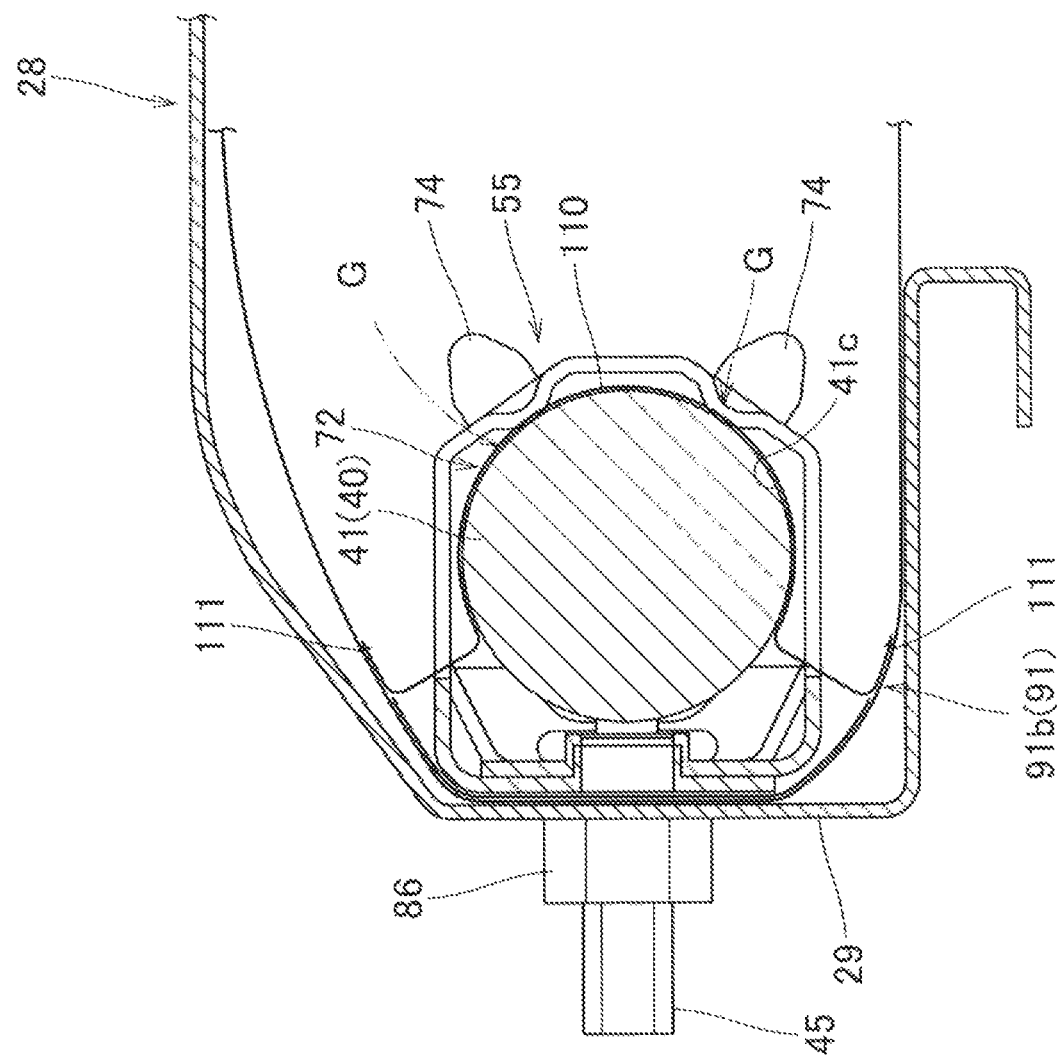
FIG. 31 is a partial enlarged vertical sectional view of the airbag device of the illustrated embodiment at airbag deployment.

The holding section 56 further includes, between the butt regions 69L and 69R in the opening-side tube section 56f, a crimp opening (or open region) 72 which exposes the outer periphery 41c of the inflator body 41 as set in the holding section 56. The crimp opening (open region) 72 is formed at a peripheral area distant from the bottom wall 57. The crimp opening 72 is provided in order to allow a later-described flap member 110 of the airbag 90 to be directly pressed against the outer periphery 41c of the inflator body 41 such that a later-described insert opening 94 of the airbag 90 is sealed at airbag deployment (FIGS. 30 and 31). More particularly, as shown in FIGS. 6 to 8, 11 and 17, the crimp opening 72 is formed in such a manner that a continuous portion of the holding section 56 except the bottom wall 57 is cut out. In the illustrated embodiment, the crimp opening 72 is formed in an area extending across the upper wall 65, rear wall 67 and lower wall 66. The width H1 (FIG. 8) in an axial direction of the inflator 40 (in a left and right direction) of the crimp opening 72 is such as to allow a later-described leading edge (left edge) 110c of the flap member 110 to be disposed therein at airbag deployment. In the illustrated embodiment, the width H1 is great enough to allow for possible slippage in the left and right direction of the flap member 110 at airbag deployment. Particularly, the width H1 is approximately one sixth of the length L1 (FIG. 8) of the holding section 56. The width H2 (FIG. 17) of the crimp opening 72 in a circumferential direction of the inflator 40 is substantially identical to the width in a front and rear direction of the flap member 110 such that the flap member 110 may seal as great area of the outer periphery of the inflator body 41 as possible. Here, the width in a front and rear direction of the flap member 110 means a distance H3 (FIG. 20) between a front region 111a and a rear region 111b of later-described seam 111 of the flap member 110. The width H2 is approximately triple of the diameter D1 (FIG. 14) of the inflator body 41.

Figure 9:
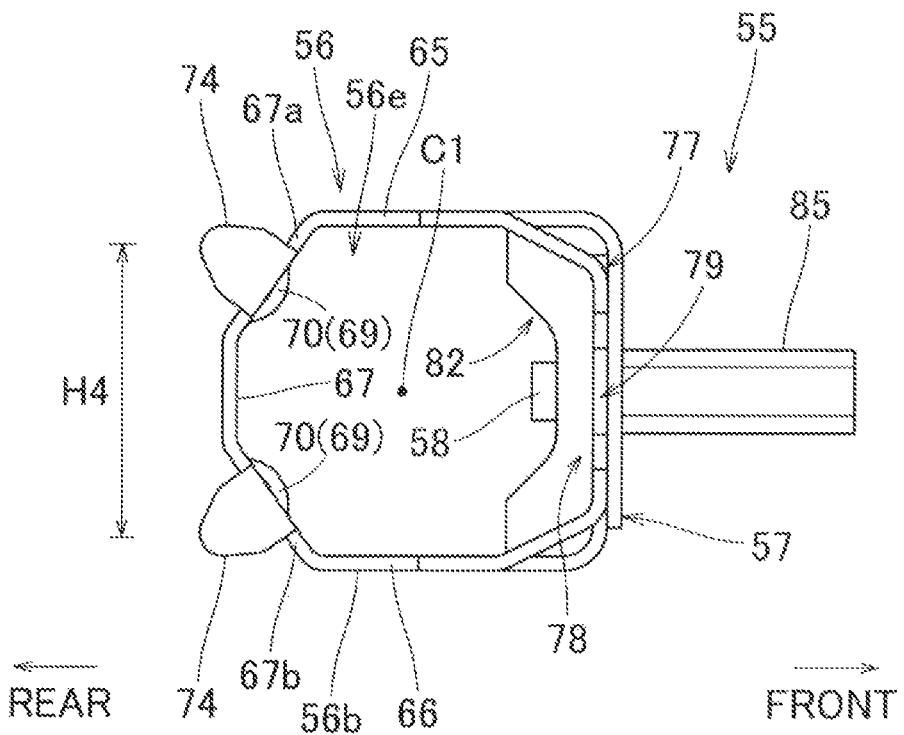
FIG. 9 is an enlarged side view of the retainer of FIG. 6 viewed from the right side.
Figure 27:
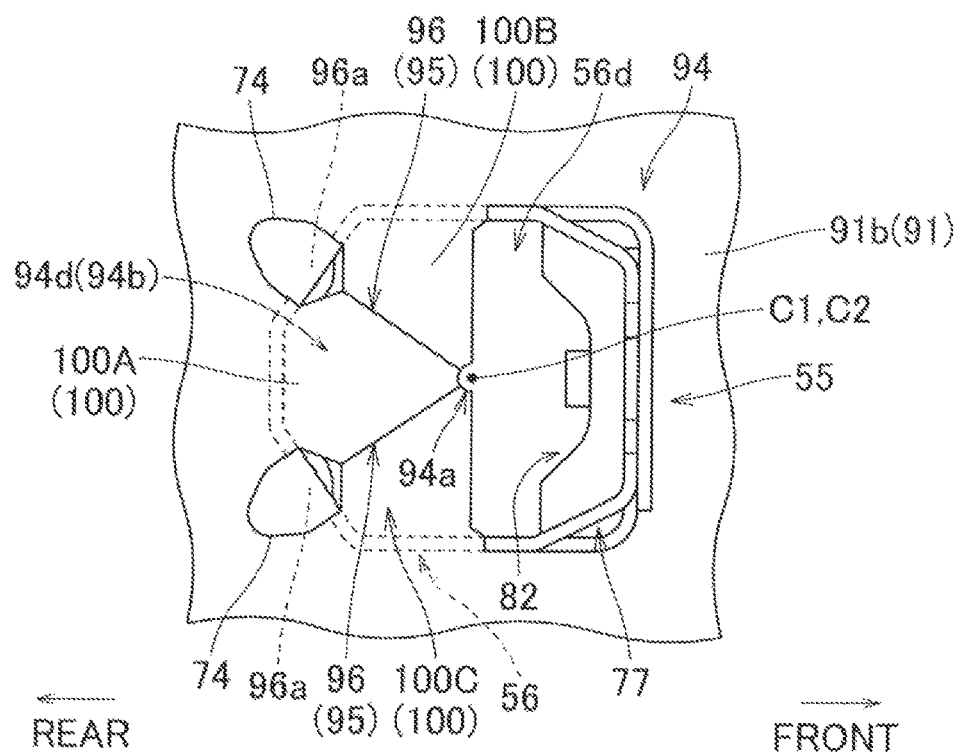
FIG. 27 is a diagram showing the insert opening of the airbag as the retainer is set inside the airbag.

At the right end 56b of the holding section 56 (or at an end of the opening-side tube section 56f disposed towards a later-described insert opening 94 of the airbag 90), there are formed two retaining pawls 74. Each of the retaining pawls 74 is to protrude out of the insert opening 94 of the airbag 90 when the retainer 55 is stored inside the airbag 90 and the airbag 90 is folded up. The retaining pawls 74 are disposed spaced-apart in a circumferential direction of the holding section 56 or inflator body 41. In the illustrated embodiment, as shown in FIG. 9, each of the retaining pawls 74 protrudes rearward out of the edge of each of the upper sloping region 67a and lower sloping region 67b. That is, the retaining pawls 74 are disposed at the rear area of the holding section 56, apart from the bottom wall 57. Each of the retaining pawl 74 has such a generally triangular contour narrowing toward the distal end, as viewed from a left and right direction. The leading end of each of the retaining pawls 74 is formed into a curving shape. When assembled with the inflator 40 and airbag 90, as shown in FIG. 27, each of the retaining pawls 74 protrudes from the insert opening 94 of the airbag 90 generally along the retaining slit 96 such that the width direction is orthogonal to the retaining slit 96 (i.e. to a direction connecting the terminal 96a and leading end 96b of the retaining slit 96), and is engaged with the terminal 96a of the retaining slit 96 in such a manner as to push peripheral areas aside. Moreover, the retaining pawls 74 are located at two circumferential positions of the inflator 40 (or of the holding section 56) which are distant generally by a diameter of the inflator body 41. That is, the clearance H4 between the two retaining pawls 74 (FIG. 9) generally coincides with the diameter D1 of the inflator body 41 (FIG. 14).

When the airbag device S of the illustrated embodiment is assembled, the retainer 55 is stored inside the airbag 90 first and the airbag 90 is folded up. After that, the body 41 of the inflator 40 is inserted into the airbag 90 via the insert opening 94 such that the inflator 40 is set inside the holding section 56 of the retainer 55 via the insert opening 56e. For a smooth insertion of the inflator body 41 into the retainer 55, the retaining pawls 74 assists with alignment of the positions of the insert opening 94 of the airbag 90 and the insert opening 56e of the retainer 55 (in other words, alignment of an insertion center C1 of the insert opening 56e of the retainer 55 and an insertion center C2 of the insert opening 94 of the airbag 90, see FIGS. 9, 20 and 27).

The bolt 85 serving as mounting means is disposed in an area to the left of the center in a left and right direction of the bottom wall 57, i.e. in an area distant from the elastically deformable support regions 58 in a left and right direction. More particularly, the location of the bolt 85 is apart from the left end of the bottom wall 57 (or left end 56a of the holding section 56) by a quarter of the length of the bottom wall 57. The bolt 85 protrudes generally vertically out of the bottom wall 57 so as to be generally perpendicular to the axis of the inflator body 41 (in other words, generally perpendicularly to the inflator body 41).

The storing cove section 78 for storing the bolt 45 of the inflator 40 is disposed in a vicinity of the right end 57c (FIG. 11) of the bottom wall 57, on the right side of the holding section 56. Specifically, the storing cove section 78 is disposed in an extended region 77 which continues from the bottom wall 57. The storing cove section 78 includes a dent 79 which is indented from the right edge 77a of the extended region 77, and a peripheral region 80 which forms the periphery of the dent 79. The extended region 77 is formed into a flat plate extending generally along the bottom wall 29 of the case 28. That is, the extended region 77 is formed generally into an extension of the bottom wall 57 of the holding section 56. The dent 79 has its opening 79a at the right edge 77a of the extended region 77 and extends in a left and right direction as shown in FIG. 7, and receives the bolt 45 of the inflator 40 when the inflator body 41 is set in the holding section 56. The width in a front and rear direction of the dent 79 is slightly greater than outer a diameter of the bolt 45. In the illustrated embodiment, the dent 79 is so formed that the right end region enlarges towards the opening 79a for easy insertion of the bolt 45, as shown in FIG. 7. If the bolt 45 of the inflator body 41 is inserted into the dent 79 via the opening 79a at the setting of the inflator body 41 in the holding section 56 of the retainer 55, the peripheral region 80 (specifically, an upper peripheral region 80b and a lower peripheral region 80c, see FIG. 7) helps set the bolt 45 in an adequate posture to protrude generally in the same direction as the bolt 85 of the retainer 55, as shown in FIG. 14. And if the bolt 45 is inserted into the dent 79 until abuts against the left edge 80a of the peripheral region 80, the bolt 45 is positioned at an adequate distance from the bolt 85 of the retainer 55 such that the bolt 45 and the bolt 85 smoothly go into the apertures 29a and 29b formed on the bottom wall 29 of the case 28 at one time.

Figure 12:
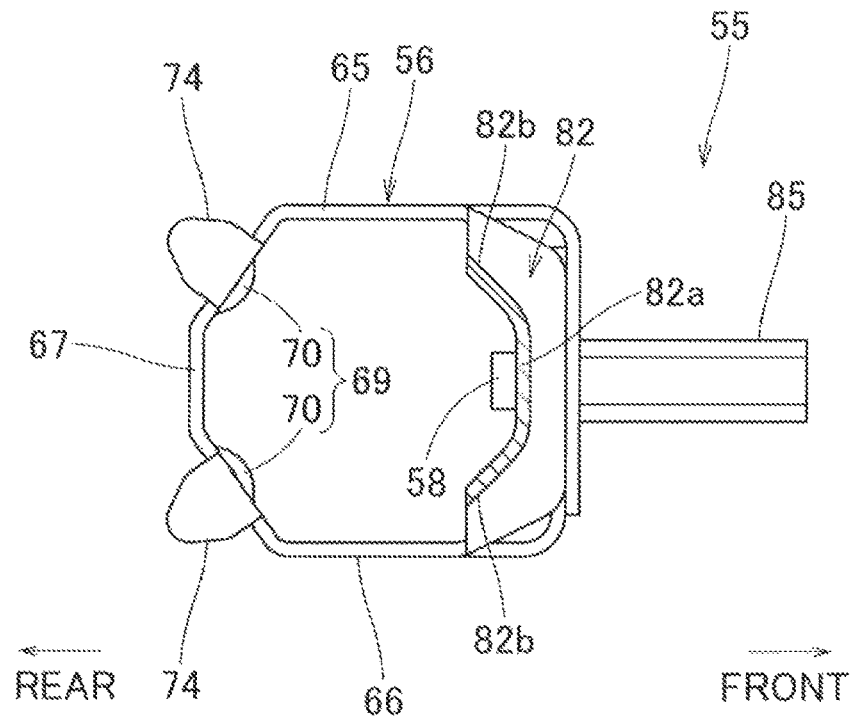
FIG. 12 is an enlarged sectional view of the retainer taken along line XII-XII of FIG. 7.
Figure 15:
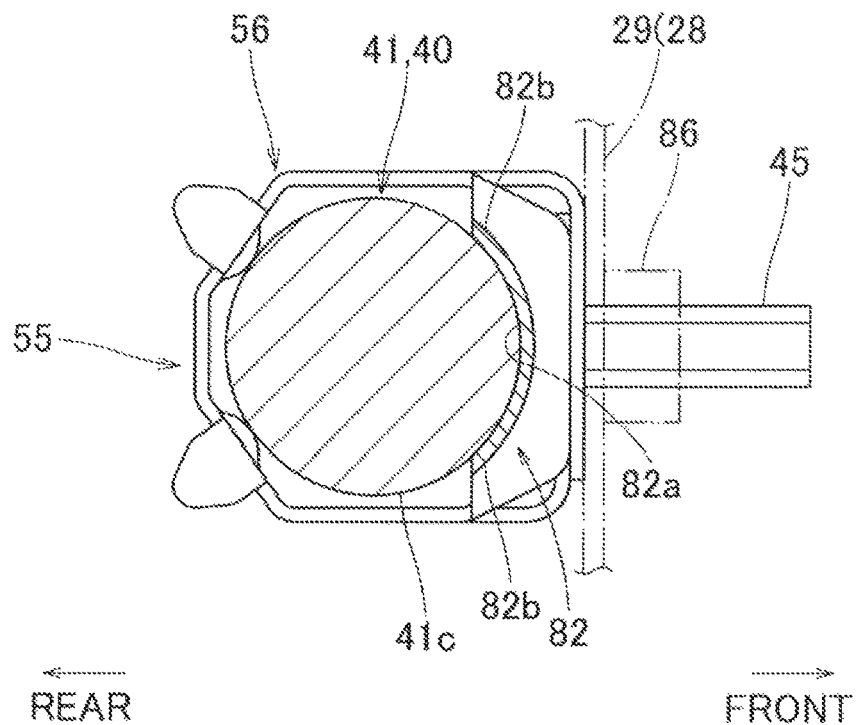
FIG. 15 is a sectional view of the retainer as mounted on the inflator, taken at the location of a pressing section.
Figure 16:
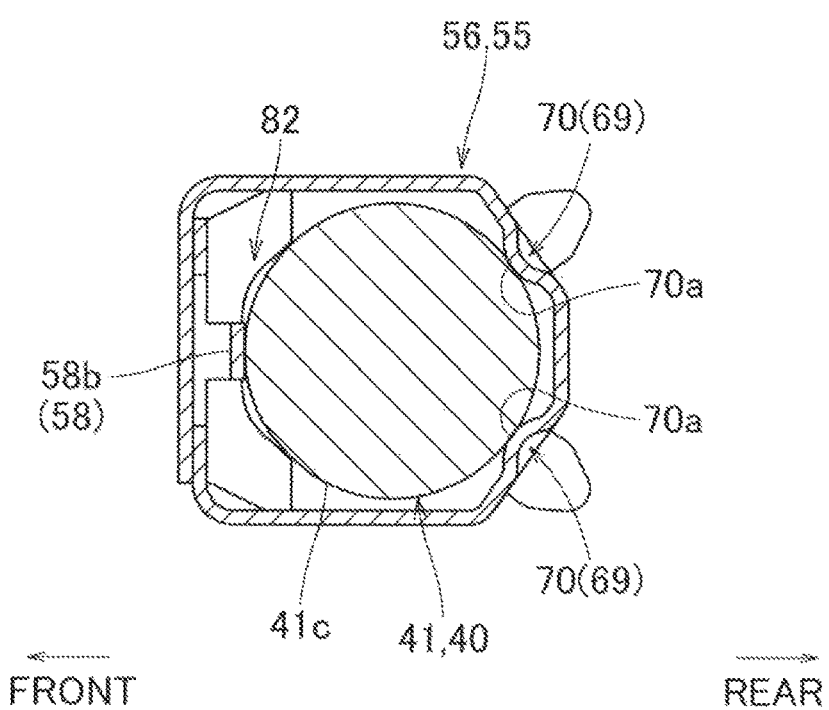
FIG. 16 is a sectional view of the retainer as mounted on the inflator, taken at the location of the elastically deformable support region and supporting projections.
Figure 17:
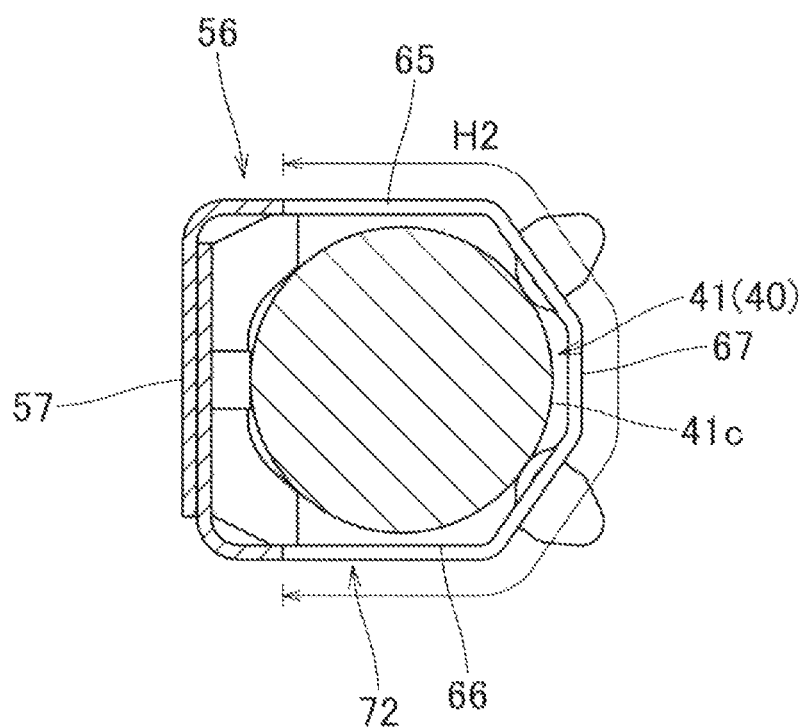
FIG. 17 is a sectional view of the retainer as mounted on the inflator, taken at the location of the crimp opening.
Figure 28:
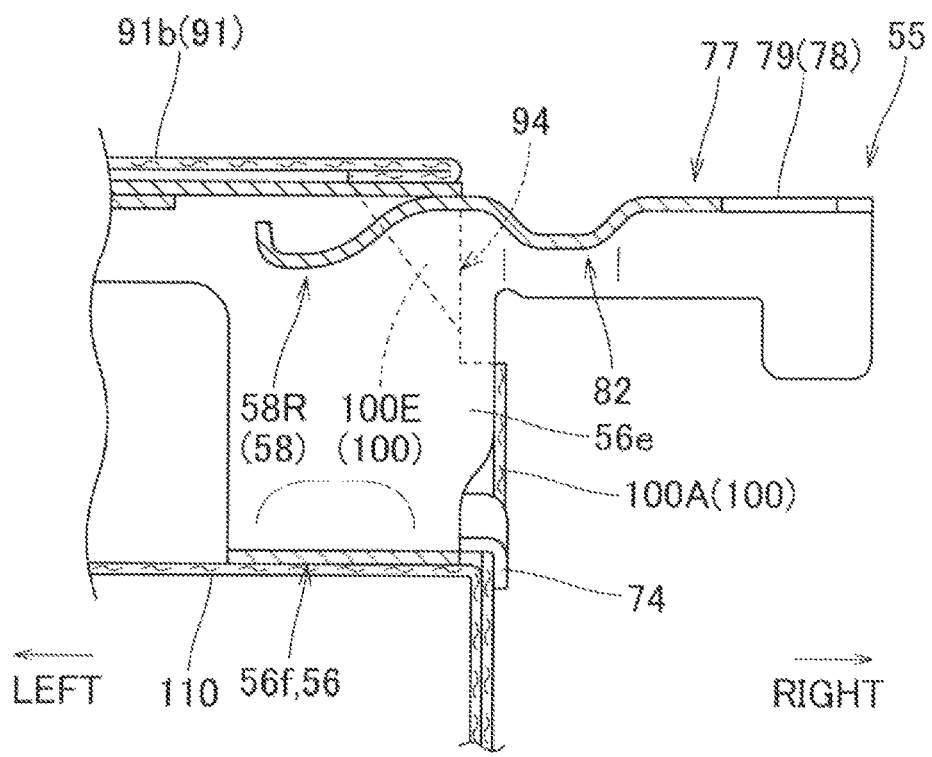
FIG. 28 is a schematic sectional view showing the insert opening of the airbag as the retainer is set inside the airbag.

The pressing section 82 is disposed between the bottom wall 57 of the holding section 56 and the extended region 77. Specifically, the pressing section 82 is disposed in a vicinity of the storing cove section 78, between the bolt 85 and the storing cove section 78. The pressing section 82 is designed to be pressed onto the outer periphery of the body 41 of the inflator 40 when the bolt 45 of the inflator 40 is fastened to the bottom wall 29 of the case 28. More particularly, the pressing section 82 is designed to be brought into contact with an extensive area in a circumferential direction of a front area of the outer periphery 41*c* of the inflator body 41 as mounted on board. As viewed from the left or right as mounted on board, the pressing section 82 extends upward and downward from the bolt 45, as shown in FIGS. 9 and 12. More particularly, as viewed from the left or right, the pressing section 82 has such a curving shape as to be capable of contacting a generally quarter circumferential area of the circumference 41*c* of the inflator body 41. Moreover, as shown in FIG. 11, in a sectional view taken along the axial direction of the inflator body 41 (or holding section 56), the pressing section 82 has such a sectional contour that rises out of the bottom wall 57 gently. As shown in FIG. 11, the protruding amount of the pressing section 82 out of the bottom wall 57 is smaller than that of the elastically deformable support region 58 as has not yet been assembled with the inflator 40. When the inflator body 41 is set in the retainer 55 and the elastically deformable support regions 58 are deformed, the leading end region 82*a* of the pressing section 82 is brought into contact with the outer periphery 41*c* of the inflator body 40, as shown in FIG. 14. To describe more specifically, as shown in FIG. 12, the sectional contour in a front and rear direction of the leading end region 82*a* of the pressing section 82 is not a generally circular arc, although gently curving in a front and rear direction. However, when the airbag 90 as holds the inflator 40 and retainer 55 inside is housed in the case 28 and the bolt 45 of the inflator 40 is fastened with a nut 86, the pressing section 82 is pressed by the inflator body 41 and deformed such that upper and lower edges 82*b* of the leading end region 82*a* are flattened as shown in FIG. 15. The leading end region 82*a* of the pressing section 82 is then brought into contact with the outer periphery 41*c* of the inflator body 40 as a whole while the inflator 40 is housed inside the case 28. That is, while the airbag device S is mounted on the vehicle, a generally whole area in the circumferential direction of the leading end region 82*a* of the pressing section 82 stays pressed onto the front area (i.e. the area facing towards the bottom wall 57) of the outer periphery 41*c* of the inflator body 41. The pressing section 82 is located adjacent the insert opening 56*e* of the holding section 56. In other words, as shown in FIG. 28, when the retainer 55 is stored inside the airbag 90, the pressing section 82 is disposed outside of the airbag 90 at a vicinity of the insert opening 94 of the airbag 90. Since the leading end region 82*a* of the pressing section 82 is in close contact with the outer periphery 41*c* of the inflator body 41 by its extensive and continuous area in the circumferential direction as shown in FIG. 15, the pressing section 82 is capable of preventing an inflation gas from flowing towards the insert opening 94 of the airbag 90. Accordingly, the pressing section 82 is further capable of preventing the inflation gas, which flows through a gap between the bottom wall 57 and inflator body 41, from further flowing towards the bolt 45 as shown in FIG. 30. Thus the airbag 90 will inflate quickly with little fear of gas leakage despite the configuration that an area of the inflator 40 having the bolt 45 is disposed outside of the airbag 90.

As described above, when the inflator body 41 is set in the holding section 56 of the retainer 55, the outer periphery 41*c* of the inflator body 41 is supported by the support body 58*b* of the elastically deformable support region 58 and the leading end 70*a* regions of the supporting projections 70 at three circumferentially spaced-apart positions, as shown in FIG. 2, and this three-point support occurs at two spaced-apart positions in the left and right direction. This configuration will help match the axial center C3 of the inflator body 41 (FIG. 21) and the axial center of the holding section 56 when the inflator body 41 is set inside the holding section 56. Furthermore, since each of the elastically deformable support regions 58L and 58R supports the inflator body 41 in an elastically deformed state, the inflator body 41 is prevented from moving in the axial direction. Accordingly, merely by setting the inflator body 41 in the holding section 56 via the insert opening 56*e* and pushing the bolt 45 into the dent 79 of the storing cove section 78 until the bolt 45 abuts against the left edge 80*a* of the peripheral region 80, the outer periphery 41*c* of the inflator body 41 will be provisionally supported by the support bodies 58*b* of the elastically deformable support regions 58L and 58R and the leading end 70*a* regions of the supporting projections 70, and the inflator body 41 will be positioned with respect to the holding section 56. Moreover, although the bolt 45 is merely inserted into the dent 79 via the opening 79*a*, the bolt 45 will be prevented from moving inside the dent 79, and steadily determined in orientation and position with respect to the bolt 85 of the retainer 55. Accordingly, the bolt 45 of the inflator 40 and the bolt 85 of the retainer 55 will smoothly go into the apertures 29*a* and 29*b* of the bottom wall 29 of the case 28 at one time.

In the airbag device S of the illustrated embodiment, the retainer 55 and inflator body 41 are preliminarily put inside the airbag 90, and the airbag 90 is stored in the case 28 as it is such that the bolt 85 of the retainer 55 and the bolt 45 of the inflator 40 protrude out of the bottom wall 29 of the case 28. Then the bolts 45 and 85 are fastened with nuts 86, such that the inflator 40 and airbag 90 are mounted on the bottom wall (i.e. the vehicle body member) 29 of the case 28. When the bolts 45 and 85 are fastened with the nuts 86, the pressing section 82 of the retainer 55 supports the inflator body 41 at a vicinity of the bolt 45, thus the inflator body 41 is securely held by the retainer 55 such that the central axis C3 is fixed with respect to the holding section 56 without inclination (i.e. such that the central axis C3 does not slip in a perpendicular direction).

Figure 18:
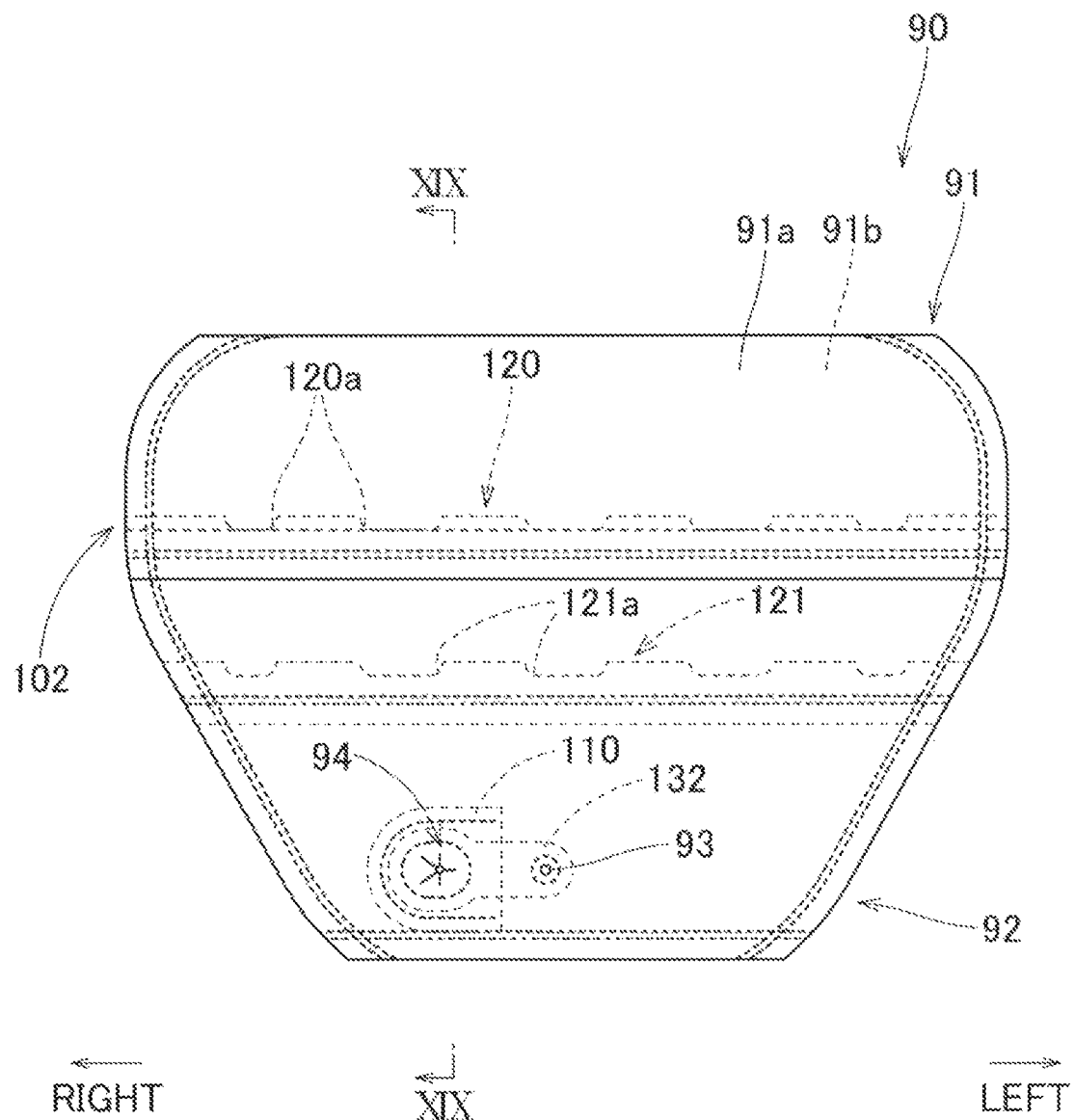
FIG. 18 is a back view of an airbag for use in the airbag device of the embodiment.
Figure 19:
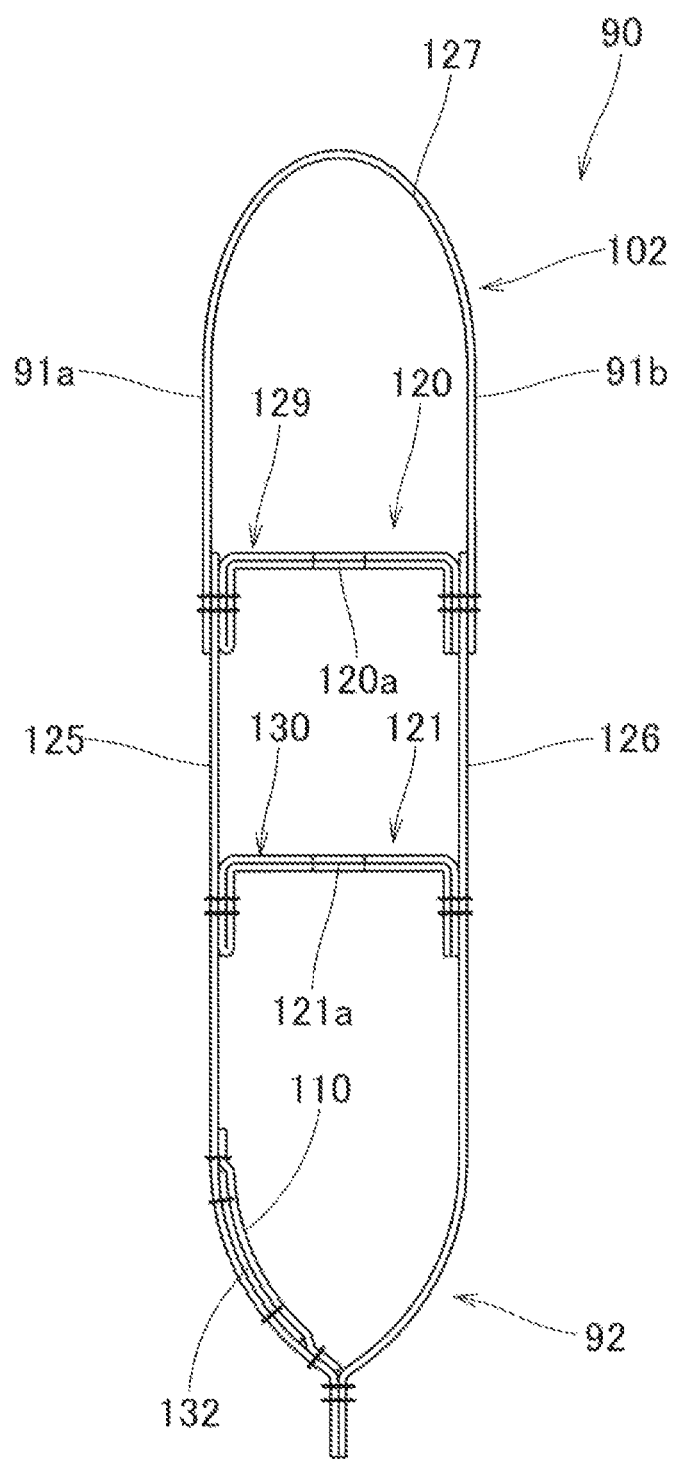
FIG. 19 is an enlarged sectional view of the airbag of FIG. 18 taken along line XIX-XIX.
Figure 22:
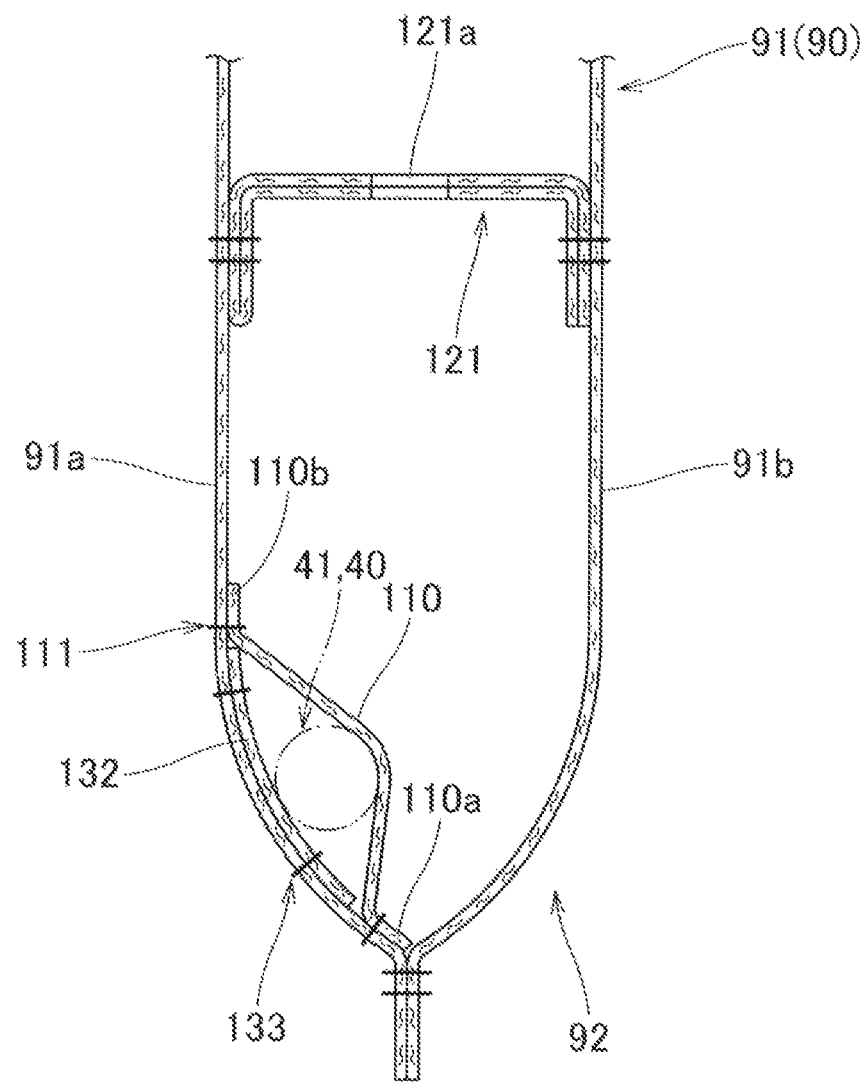
FIG. 22 is a partial enlarged vertical sectional view of the airbag showing especially a mount region.

As shown in FIGS. 18, 19 and 22, the airbag 90 of the illustrated embodiment includes a bag body 91, a flap member 110 disposed inside the bag body 91 and two tethers 120 and 121 disposed inside the bag body 91.

The bag body 91 is designed to be inflated into a generally rectangular board for protecting left and right knees K (KL and KR) of the driver D, as shown in FIG. 4 (double-dotted lines) and FIG. 18. As shown in FIG. 18, the bag body 91 is formed by joining together peripheral edges of two walls having generally identical contours; a vehicle body side wall 91*a* which is deployable towards the steering column 7 and an occupant side wall 91*b* which is deployable toward the driver's seat. The bag body 91 includes a mount region 92 which is disposed towards the case 28 when deployed and a protecting region 102 which is greater in width in a left and right direction than the mount region 92 and protects the driver's knees K (KL and KR).

Figure 20:
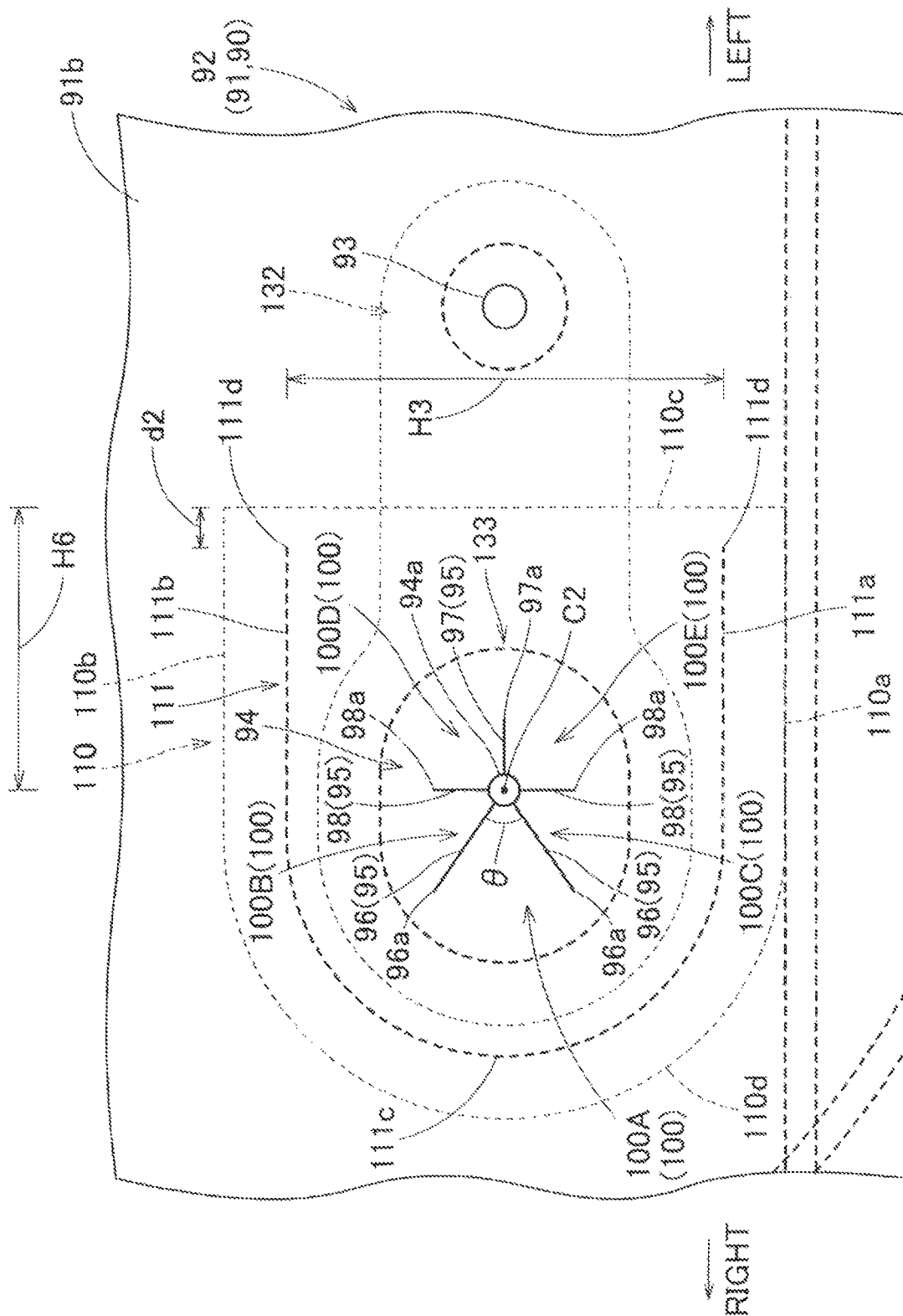
FIG. 20 is a partial enlarged back view of the airbag showing especially an insert opening.

As shown in FIGS. 18 and 20, the mount region 92 includes, on the vehicle body side wall 91*a*, an insert opening 94 via which the inflator body 41 is inserted into the bag body 91, and a mounting hole 93 out of which the bolt 85 of the retainer 55 protrudes. The insert opening 94 is formed in a vicinity of the right end of the mount region 92 and the mounting hole 93 is disposed to the left of the insert opening 94. In the illustrated embodiment, the mounting hole 93 is located slightly to the right of the center in a left and right direction of the bag body 91.

Figure 21:
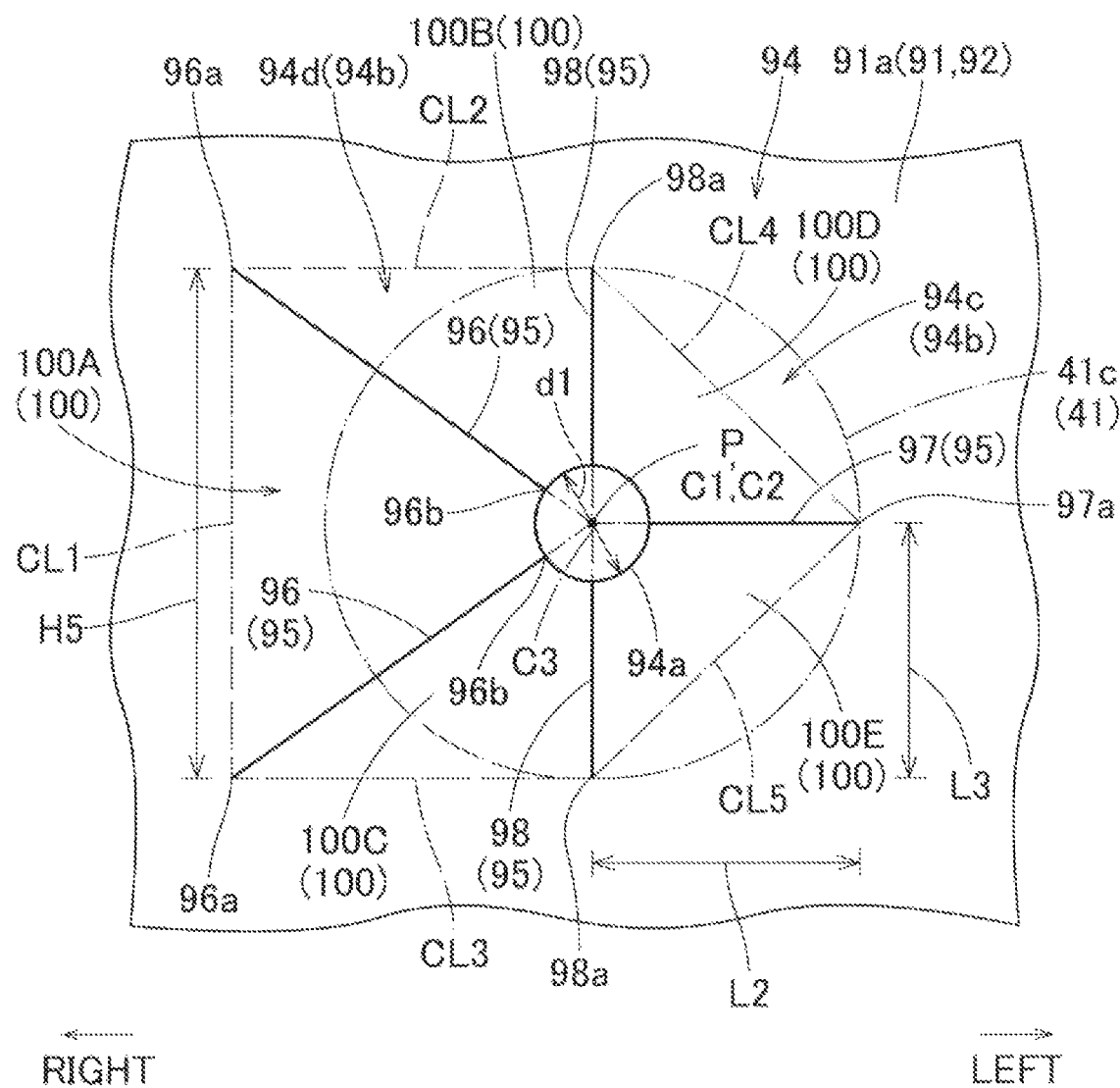
FIG. 21 is a schematic partial enlarged view showing the arrangement of slits of the insert opening.

The insert opening 94 is composed of an opening-forming region which includes a plurality of slits 95 formed on the vehicle body side wall 91a. In the illustrated embodiment, more specifically, as shown in FIGS. 20 and 21 in detail, the insert opening 94 includes a small round aperture 94a which forms an insertion center C2 of the opening 94 as the inflator body 41 is inserted, and an openable region 94b disposed in the periphery of the aperture 94a. The slits 95 are formed in the openable region 94b to extend from the aperture 94a. The aperture 94a facilitates a forming of the slits 95. The size of the aperture 94 is such as not to hinder a sealing property at the insert opening 94. In the illustrated embodiment, the inner diameter d1 (FIG. 21) of the aperture 94a is approximately one fifth of the diameter D1 of the inflator body 41. The slits 95 of the illustrated embodiment includes two retaining slits 96, a first auxiliary slit 97 and two second auxiliary slits 98. In the illustrated embodiment, the set of the slits 95 is generally symmetric with respect to a horizontal line running through the insertion center C2 (i.e. generally symmetric in an up and down direction as mounted on board) when the bag body 91 is flatly unfolded.

Each of the retaining slits 96 is so formed that the direction from the terminal 96a to the leading end 96b heads towards the center (or insertion center C2) of the insert opening 94 such that the two retaining slits 96 intersect each other. In the illustrated embodiment, the two retaining slits 96 extend diagonally towards the right from the aperture 94a (i.e. the insertion center C2) such that the terminals 96a draw away from each other in a front and rear direction in the bag body 91 as flatly unfolded. That is, the retaining slits 96 intersect each other inside the aperture 94a, on their extensions. In the illustrated embodiment, the hypothetical intersection point P of the retaining slits 96 coincides with the center of the aperture 94a (i.e. the insertion center C2 of the insertion opening 94), as shown in FIG. 21. Further, the retaining slits 96 adjoin each other on the right area (in a "pawl-side region 94d," which is disposed towards the retaining pawls 74 of the retainer 55 as mounted on board) of the aperture 94a in the openable region 94b. As described above, the retaining pawls 74 of the retainer 55 protrude from the terminals 96a of the retaining slits 96 as shown in FIG. 27, when the retainer 55, inflator 40 and airbag 90 are assembled together. The distance H5 (FIG. 21) between the terminals 96a of the retaining slits 96 is the same as the clearance H4 between the retaining pawls 74 and generally the same as the diameter D1 of the inflator body 41. In the illustrated embodiment, the intersection angle θ (FIG. 20) between the two retaining slits 96 is approximately 80°. When mounted on board, the retaining slits 96 extend diagonally rearward from the aperture 94a in such a manner as to draw away from each other in an up and down direction.

The first auxiliary slit 97 extends from the intersection point P in such a manner that the terminal 97a draws away from the retaining slits 96. Specifically, in the bag body 91 as flatly unfolded as shown in FIGS. 20 and 21, the first auxiliary slit 97 extends towards the left from the intersection point P (or aperture 94a). The first auxiliary slit 97 of the illustrated embodiment is formed into a straight line extending generally in a left and right direction. The length L2 (FIG. 21) of the first auxiliary slit 97 from the intersection point P is approximately a half of the diameter D1 of the inflator body 41. When mounted on board, the first auxiliary slit 97 extends generally along a front and rear direction towards the bottom wall 29 of the case 28, i.e. towards the front, from the aperture 94a. The two second auxiliary slits 98 extend towards opposite directions from the intersection point P, generally perpendicularly to the first auxiliary slit 97. In the bag body 91 as flatly unfolded as shown in FIGS. 20 and 21, the second auxiliary slits 98 of the illustrated embodiment extend towards the front and rear from the intersection point P (or aperture 94a). Each of the second auxiliary slits 98 of the illustrated embodiment is a straight line extending generally in a front and rear direction. The length L3 (FIG. 21) of each of the second auxiliary slits 98 is generally the same as the length L2 of the first auxiliary slit 97, i.e. approximately a half of the diameter D1 of the inflator body 41. That is, the terminals 98a of the second auxiliary slits 98 are located on the same horizontal lines as the terminals 96a of the retaining slits 96.

In the illustrated embodiment, the first auxiliary slit 97 and second auxiliary slits 98 are disposed in the left area (in a "bottom-side region 94c," which is disposed towards the bottom wall 57 of the retainer 55 as mounted on board) of the aperture 94a in the openable region 94b. In other words, the auxiliary slits 97 and 98 are disposed in an opposite area to the retaining slits 96 with respect to the aperture 94a. In the illustrated embodiment, furthermore, when the inflator body 41 is projected on the bag body 91 as flatly unfolded such that the axial center C3 of the inflator body 41 and the insertion center C2 of the insert opening 94 are matched, the terminals 97a and 98a of the auxiliary slits 97 and 98 fall on the outer periphery 41c of the inflator body 41 as shown in FIG. 21 whereas the terminals 96a of the retaining slits 96 are located at farther outer positions than the outer periphery 41c of the inflator body 41.

Figure 29:
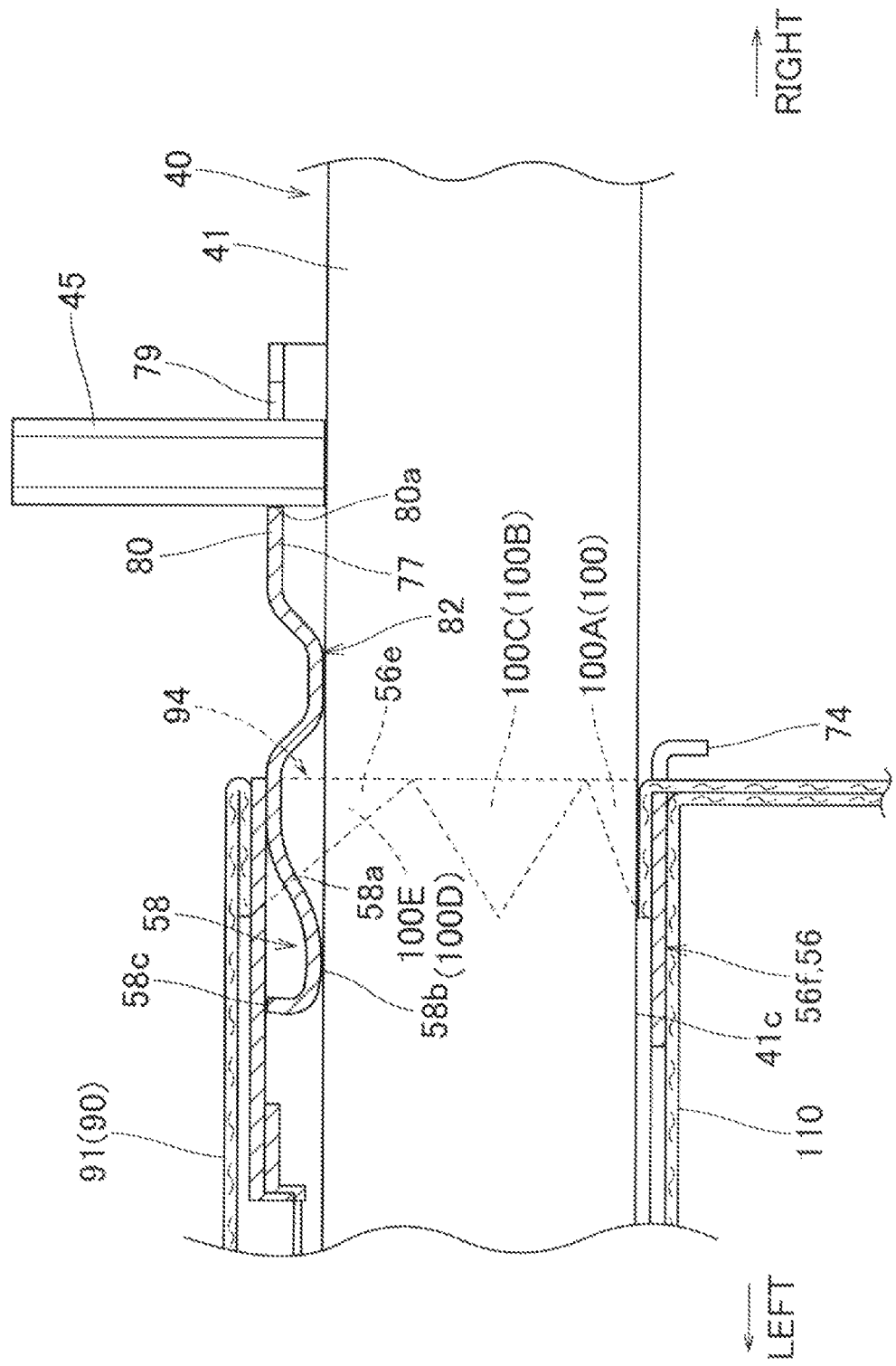
FIG. 29 is a schematic sectional view showing the inflator as inserted into the retainer via the insert opening of the airbag.

When the inflator body 41 is inserted into the airbag 90 via the insert opening 94, areas among the retaining slits 96, first auxiliary slit 97 and second auxiliary slits 98 in the openable region 94b are folded inward and brought into contact with the outer periphery 41c of the inflator body 41, and each serve as a folded sealing region 100 for covering the outer periphery 41c of the inflator body 41. As shown in FIGS. 20 and 21, five folded sealing regions 100A, 100B, 100C, 100D and 100E are provided in the illustrated embodiment. Each of the folded sealing regions 100 is folded on a straight line CL1/CL2/CL3/CL4/CL5 (single-dotted lines in FIG. 21) connecting adjoining leading ends 96a, 97a or 98a, and formed generally into a triangle. To describe more specifically, in the illustrated embodiment, the folded sealing regions 100D and 100E are composed of the areas between the first auxiliary slit 97 and second auxiliary slits 98, in other words, composed of the bottom-side region 94c of the openable region 94c, or in further other words, composed of an area disposed in front of the insertion center C2 as mounted on board. The folded sealing regions 100D and 100E are folded inward and brought into contact with the outer periphery of the front area (i.e. the bottom wall 57 and front areas of the upper wall 65 and lower wall 66) of the holding section 56 of the retainer 55 when the retainer 55 is set inside the airbag 90 before the inflator 40 is inserted, as shown in FIG. 28. On the other hand, the folded sealing regions 100A, 100B and 100C are composed of the areas between the retaining slits 96 and second auxiliary slits 98, in other words, composed of the pawl-side region 94d of the openable region 94c, or in further other words, composed of an area disposed at the rear of the insertion center C2 as mounted on board. The folded sealing regions 100A, 100B and 100C are folded inward and brought into contact with the outer periphery 41c of the inflator body 41 when the inflator 40 is inserted into the airbag 90, as shown in FIG. 29.

As shown in FIGS. 18 and 20, the airbag 90 is provided with a reinforcing cloth 132 for reinforcing an area extending across the insert opening 94 and mounting hole 93. The reinforcing cloth 132 is sewn to the vehicle body side wall 91a with two seams, at the periphery of the insert opening 94 and at the periphery of the mounting hole 93. The seam 133, which is formed in the periphery of the insert opening 94, has a generally oval shape and surrounds the insert opening 94 all over.

Referring to FIGS. 18, 20 and 22, the flap member 110 is disposed inside the bag body 91 so as to cover the insert opening 94. More specifically, in the bag body 91 as flatly unfolded, the flap member 110 is so disposed as to cover the insert opening 94 (i.e. the aperture 94a and openable region 94b) entirely, including the seam 133 connecting the reinforcing cloth 132 to the vehicle body side wall 91a. The circumferential edge of the flap member 110 except the leading edge (left edge) 110c is joined to the vehicle body side wall 91a of the bag body 91 with a single seam 111 in the circumference of the insert opening 94. Specifically, the flap member 110 in a flattened state has such an outer contour that the front edge 110a and rear edge 110b are straight lines extending generally along a left and right direction, the left edge (or leading edge) 110c is a straight line extending generally along a front and rear direction and the right edge 110d is a generally semicircular arc. The left edge or leading edge 110c of the flap member 110 is located slightly to the left (i.e. towards the mounting hole 93) of the center of a clearance between the mounting hole 93 and the insertion center C2 (or aperture 94a) of the insert opening 94. The front edge 110a, right edge 110d and rear edge 110b of the flap member 110 are joined to the vehicle body side wall 91a of the bag body 91 with the single continuous seam 111 such that the flap member 110 closes off the insert opening 94 on three sides except the left side. More specifically, the seam 111 is formed along the outer circumferential edge of the flap member 110, and includes a front region 111a which runs generally straightly in the front region of the bag body 91 as flatly unfolded, a rear region 111b which runs generally straightly in the rear region of the bag body 91 as flatly unfolded, and a right region 111c which forms a generally semicircular arc in the right region of the bag body 91 as flatly unfolded. The seam 111 is positioned at farther outward position in a front-rear and left-right directions than the reinforcing cloth 132. In other words, the flap member 110 covers the reinforcing cloth 132 all over except an area for reinforcing the periphery of the mounting hole 93.

Figure 23:
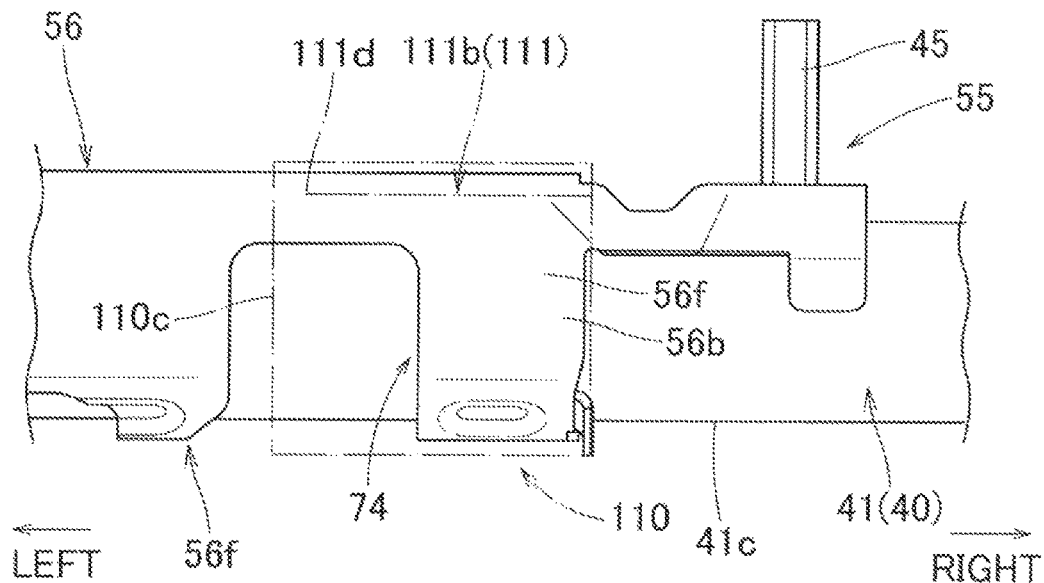
FIG. 23 is a schematic partial enlarged plan view showing the position of a flap member of the airbag as the retainer and inflator are inserted into the airbag.
Figure 24:
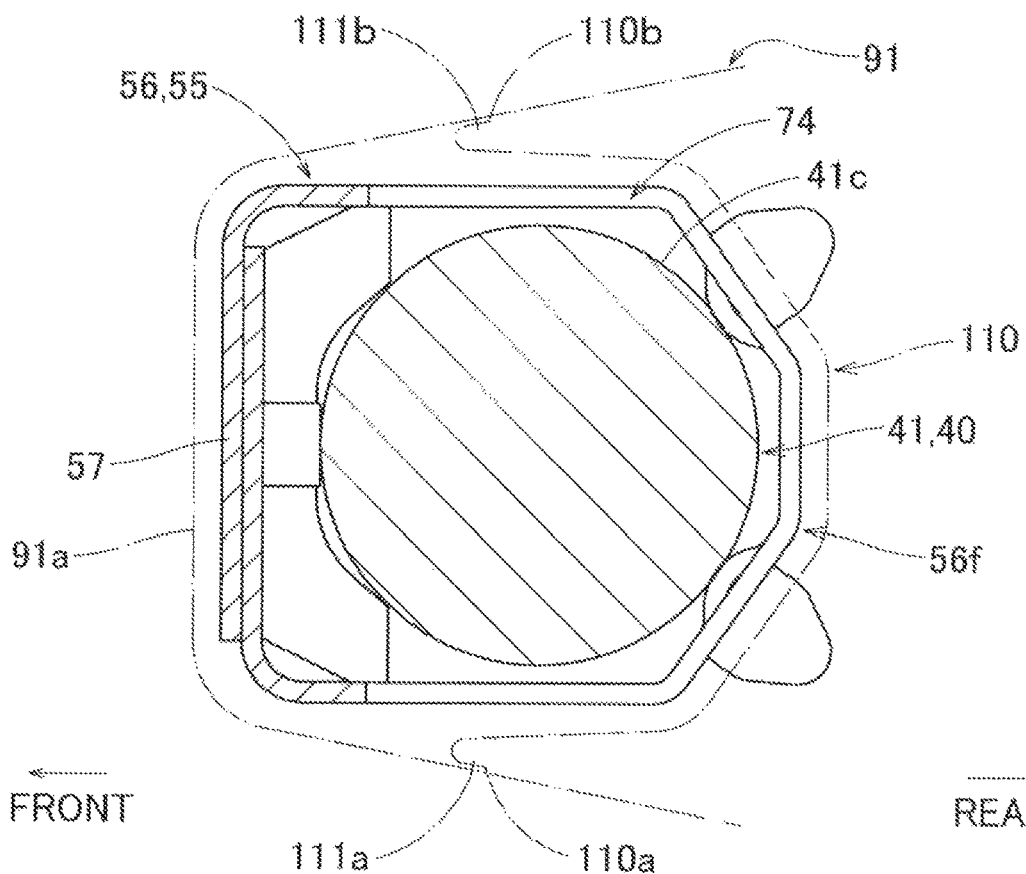
FIG. 24 is a schematic partial sectional view showing the position of the flap member as the retainer and inflator are inserted into the airbag.

The width in a front and rear direction of the flap member 110 (which equals to the distance H3 between the front region 111a and rear region 111b of the seam 111, shown in FIG. 20) is approximately triple of the diameter D1 of the inflator body 41. This width is such that allows the inflator 40 to be placed between the flap member 110 and vehicle body side wall 91a with ease, and such that enables the flap member 110 to cover the upper side, rear side and lower side of the holding section 56 (or opening-side tube section 56f) when the inflator 40 and retainer 55 are set in the airbag 90, as indicated with double-dotted lines in FIG. 24. The distance H6 (FIG. 20) between the insertion center C2 of the insert opening 94 and the left edge (leading edge) 110c of the flap member 110 is approximately twice of the diameter D1 of the inflator body 41. With this width H6, as indicated with double-dotted lines in FIG. 23, the left edge 110c of the flap member 110 falls within the crimp opening 72 (particularly, within an area to the left of the center in a left and right direction of the crimp opening 72) when the retainer 55 and inflator 40 are set in the bag body 91. In the illustrated embodiment, furthermore, the seam 111, which connects the flap member 110 to the vehicle body side wall 91a, is formed in such a manner that an unsewn region with a width d2 is left between each of the terminals 111d and the left edge (leading edge) 110c of the flap member 110, as shown in FIG. 20. Further, the position of each of the terminals 111d of the seam 111 in the axial direction of the inflator 40 falls within the crimp opening 72, as indicated with double-dotted lines in FIG. 23.

The tethers 120 and 121 are disposed one above the other inside the bag body 91 and each extend generally along a left and right direction. The tethers 120 and 121 are provided to limit the thickness of the bag body 91 at deployment. The tether 121, which is disposed on the lower side, partitions the protecting region 102 from the mount region 92. The tether 120, which is disposed on the upper side, partitions the protecting region 102 into two in the middle of an up and down direction. Each of the tethers 120 and 121 is provided with a plurality of gas communication holes 120a/121a for allowing gas communication.

Figure 26:
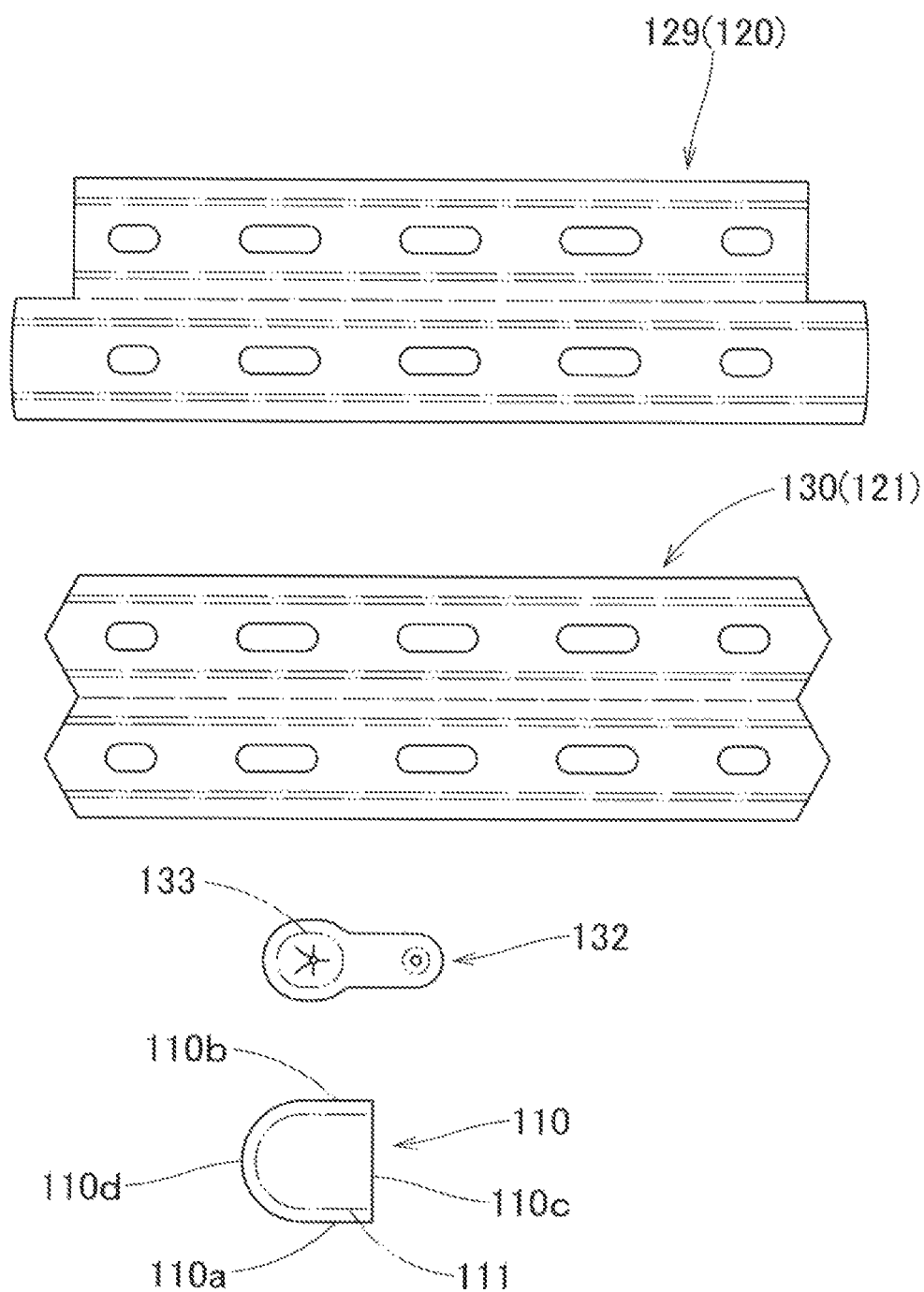

In the illustrated embodiment, the airbag 90 is composed of a plurality of base materials cut in predetermined contours. The base materials are formed of a fabric woven with polyester, polyamide yarns or the like, and the airbag 90 is formed by sewing the base materials together with a sewing thread. As shown in FIGS. 25 and 26, the airbag 90 of the illustrated embodiment is composed of three body base cloths 125, 126 and 127 for forming the vehicle body side wall 91a and occupant side wall 91b, two tether base cloths 129 and 130, the flap member 110 and the reinforcing cloth 132.

The body base cloth 125 forms an area of the vehicle body side wall 91a from the mount region 92 to the location of the upper tether 120 (i.e. an area of the vehicle body side wall 91a disposed below the upper tether 120). The body base cloth 126 forms an area of the occupant side wall 91b from the mount region 92 to the location of the upper tether 120 (i.e. an area of the occupant side wall 91b below the tether 120). The body base cloth 127 forms areas of the vehicle body side wall 91a and occupant side wall 91b above the tether 120. The tether base cloths 129 and 130 form the tethers 120 and 121 each in a doubled state.

Mounting of the airbag device S on the vehicle is now described. Firstly, the retainer 55 is put inside the airbag 90 via the insert opening 94 and disposed such that the bolt 85 protrudes out of the mounting hole 93. Then each of the retaining pawls 74 of the retainer 55 is taken out of a vicinity of each of the terminals 96a of the retaining slits 96 of the insert opening 94. At this time, as shown in FIG. 28, the flap member 110 is arranged over the opening-side tube section 56f of the holding section 56 of the retainer 55, and the folded sealing regions 100D and 100E, which are composed of the areas between the first auxiliary slit 97 and second auxiliary slits 98 (i.e. the bottom-side region 94c of the openable region 94b), are folded inward so as to cover the outer periphery of the front area (i.e. the bottom wall 57 and front areas of the upper wall 65 and lower wall 66) of the holding section 56 of the retainer 55, such that the front area of the insert opening 94, in other words, the bottom-side region 94c of the openable region 94b or the region disposed towards the front (towards the bottom wall 57) as mounted on board, is opened, as shown in FIG. 27. Then the airbag 90 is folded up so as to fit in the case 28, and wrapped up with a wrapping member (not shown) for keeping the folded-up configuration. The bolt 85 of the retainer 55 and the area around the slits 95 are taken out of the wrapping member, and the retaining pawls 74 of the retainer 55 are kept outside of the retaining slits 96.

Then the body 41 of the inflator 40 is set in the airbag 90 (i.e. in the holding section 56 of the retainer 55) via the insert opening 94, from the gas release section 42, and the bolt 45 of the body 41 is pushed into the dent 79 of the storing cove section 78 of the retainer 55 until it abuts against the left edge 80a of the peripheral region 80. At this time, the folded sealing regions 100A, 100B and 100C formed among the retaining slits 96 and second auxiliary slits 98 (i.e. composed of the pawl-side region 94d of the openable region 94b) are folded inward and disposed between the inflator body 41 and holding section 56 of the retainer 55 so as to cover the outer periphery 41c of the inflator body 41, while the flap member 110 covers the inflator body 41 from outside of the opening-side tube section 56f, as shown in FIG. 29. In the meantime, the support bodies 58b of the elastically deformable support regions 58 and the leading ends 70a of the supporting projections 70 of the butt regions 69 hold the inflator body 41 from moving both in the axial direction and in a direction perpendicular to the axis, thus the holding section 56 provisionally supports the inflator body 41. Thereafter, the airbag 90 and the inflator 40 are stored in the case 28 such that the bolts 45 and 85 protrude out of the apertures 29a and 29b of the bottom wall 29, and the bolts 45 and 85 are fastened with the nuts 86. Thus the airbag 90 and inflator 40 are mounted on the bottom wall (i.e. vehicle body member) 29 of the case 28. At this time, due to fastening with the nuts 86, the edges 82b of the leading end region 82a of the pressing section 82 in the retainer 55 are deformed and a generally entire, continuous area of the leading end region 82a of the pressing section 82 is pressed onto the outer periphery 41c of the inflator body 41 (specifically, onto the outer periphery 41c of the front area of the inflator body 41 facing towards the bottom wall 57). The body 41 of the inflator 40 is thus prevented from slipping with respect to the retainer 55 by the bolt 45 and pressing section 82 located proximate to the bolt 45, and secured to the bottom wall 29 tightly.

Thereafter, the airbag cover 16 is assembled with the case 28 by having the hooks 32a and 33a engaged with peripheral areas of the retaining holes 21a and 22a, such that an airbag module is completed. This airbag module is mounted on the vehicle with the aid of the brackets 4. In the meantime, the connector 47 provided with a lead wire 48 leading to an airbag actuating circuit is connected with the connection port 43 of the inflator body 41 exposed from the through opening 35R of the case 28. If then the dashboard 12 and undercover 13 (FIGS. 1 and 2) are mounted, the airbag device S is mounted on the vehicle.

After the airbag device S is mounted on the vehicle, if an actuating signal is fed to the inflator body 41 via the lead wire 48, the inflator body 41 will emit an inflation gas out of the gas discharge ports 42a into the airbag 90 via the outlet openings 56b and 56c of the holding section 56 of the retainer 55. Then the airbag 90 will inflate and break the wrapping member, push the door 18 of the airbag cover 16, and the door 18 will open upward and downward about the hinges 20 along with rupture of the breakable region 19, such that the airbag body 91 will emerge out of the emergence opening 28a of the case 28 and deploy rearwardly as indicated by double-dotted lines in FIGS. 1 and 4.

In the airbag device S of the illustrated embodiment, the airbag 90 includes the flap member 110 which is disposed inside of the bag body 91 and covers the insert opening 94 of the airbag 90 entirely. The flap member 110 is joined to the bag body 91 by the circumferential edge except the leading edge (left edge) 110c which is disposed towards the leading end 41a of the inflator 40 provided with the gas release section 42, with the seam 111. That is, the flap member 110 forms a pocket with the leading edge 110 unsewn. At airbag deployment, this configuration will make it difficult for an inflation gas G to flow into a space between the bag body 91 and the flap member 110 which covers the holding section 56 (opening-side tube section 56f), and will prevent the flap member 110 from floating with the gas G. The airbag device S of the illustrated embodiment is configured such that the inflation gas G discharged from the gas release section 42 flows into the airbag 90 via the outlet openings 56c and 56d of the holding section 56 disposed at the rear of the gas release section 42, which will suppress the gas G from heading towards the flap member 110 via a space between the holding section 56 and inflator body 41. Accordingly, the pressure of the inflation gas G (or the internal pressure of the bag body 91) will press the flap member 110 against the outer periphery 41c of the inflator body 41 via the crimp opening 72 of the retainer 55 smoothly. To describe more specifically, when the airbag 90 is inflated, the flap member 110 is subjected to a pressing force of the inflation gas G, which fills the airbag 90, and thrusts into the crimp opening 72 and is pressed against the outer periphery 41c of the inflator body 41. Moreover, the airbag device S of the illustrated embodiment is configured such that the left edge 110c of the flap member 110 falls within an area of the crimp opening 72. In other words, the left edge 110c is located at a position to be pressed against the outer periphery 41c of the inflator body 41 via the crimp opening 72 at airbag deployment. Therefore, the left edge 110c of the flap member 110 will be brought into close contact with the outer periphery 41c of the inflator body 41 to ensure gas tightness, such that a gas leakage from the insert opening 94 will be prevented. Further, the airbag device S is simple in configuration and can be manufactured with reduced cost in comparison with conventional airbag devices, since the flap member 110, which has a sheet-shape, is merely joined to the bag body 91 by the circumferential edge in the circumference of the insert opening 94.

Therefore, the airbag device S of the foregoing embodiment provides a good sealing property of the insert opening 94 of the airbag 90 with a simple structure.

In the airbag device S of the foregoing embodiment, the insert opening 94 of the airbag 90 is composed of the slits 95 which are formed on the vehicle body side wall 91a of the bag body 91. With this configuration, an area around the slits 95 covers the outer periphery 41c of the inflator body 41 as set inside the airbag 90, which enhances the sealing property. Moreover, the retainer 55 is provided with the retaining pawls 74 which protrude from the slits 95 and are engaged with the periphery of the insert opening 94. The retaining pawls 74 assists with alignment of the positions of the insert opening 94 of the airbag 90 and the holding section 56 of the retainer 55 (in other words, alignment of the insertion center C1 of the insert opening 56e of the retainer 55 and the insertion center C2 of the insert opening 94 of the airbag 90), thereby facilitating an inserting work of the inflator 40. Furthermore, the engagement of the retaining pawls 74 with the periphery of the insert opening 94 will also help with steady positioning of the flap member 110 with respect to the holding section 56 (or opening-side tube section 56f), i.e. steady positioning of the left edge 110c of the flap member 110 within the area of the crimp opening 72. If such an advantageous effect does not have to be considered, the insert opening of the airbag may be formed by cutting off a portion of the base material of the bag body in a round shape, square shape or the like.

In the airbag device S of the foregoing embodiment, particularly, the insert opening 94 of the airbag 90 is composed of more than one straight slits 95 formed on the base material (or vehicle body side wall 91a) of the airbag 90, and the regions among the slits 95 serve as the folded sealing regions 100 which are folded inward and brought into contact with and cover the outer periphery 41c of the inflator body 41. This configuration will hardly form a gap between the inflator body 41 and insert opening 94 and ensure a good gas tight property of the insert opening 94 of the airbag 90.

In the airbag device S of the foregoing embodiment, furthermore, the seam 111, which connects the flap member 110 to the vehicle body side wall 91a, is formed such that an unsewn region with the width d2 is left between each of the terminals 111d and the left edge (leading edge) 110c of the flap member 110, and such that the position of each of the terminals 111d in the axial direction of the inflator 40 falls within the crimp opening 72. In other words, the seam 111 joins the flap member 110 to the bag body 90 in the circumference of the insert opening 94 to a position reaching the crimp opening 72. This configuration allows for a certain ease at the left edge 110c of the flap member 110 and facilitate an inserting work of the inflator 40 when inserting the inflator 40 into the airbag 90 via the insert opening 94. This configuration will also provide the left edge 110c of the flap member 110 with greater flexibility in movement with respect to the bag body 91 in comparison with an instance where the seam extends to the left edge 110c. Accordingly, the left edge 110c of the flap member 110 will be further adequately brought into close contact with the outer periphery 41c of the inflator body 41 when subjected to a pressure of the inflation gas. If such an advantageous effect does not have to be considered, the seam may be formed to extend to the leading edge of the flap member.

Although the illustrated embodiment has been described as applied to the airbag device S for knee protection, application of the invention should not be limited thereby. The invention may also be applied to a side airbag device which is adapted to be mounted on a backrest of a seat of a vehicle, by way of example.

In the airbag device S of the illustrated embodiment, each of the retainer 55 and inflator 40 is provided with a bolt 85/45. The bolt 45 of the inflator 40 is disposed outside of the airbag 90, and the extended region 77 of the retainer 55, which is provided with the storing cove section 78 for receiving the bolt 45 of the inflator 40, is also disposed outside of the airbag 90 via the insert opening 94. However, the present invention may be applied to an airbag device in which the inflator is not provided with any bolt whereas the retainer includes at least two bolts.

What is claimed is:

1. An airbag device adapted to be mounted on a vehicle, comprising:
   an airbag that is inflatable with an inflation gas, the airbag including a bag body that is formed of a base material having flexibility, an insert opening that is formed on the bag body, and a flap member that has a sheet-shape and is disposed inside the bag body for covering the insert opening;
   an inflator that feeds the airbag with the inflation gas, the inflator including a leading end region provided with a gas release section and a root end region; and
   a retainer that mounts the airbag and the inflator on a vehicle body member,
      wherein the retainer comprises: a holding section that is tubular in outer contour and holds the inflator therein; and a mounting bolt that protrudes out of a bottom region of the holding section and is adapted to be secured to the vehicle body member in order to mount the airbag and the inflator on the vehicle body member; and
      wherein the retainer is placed inside the airbag with the mounting bolt protruded out of the airbag, and holds the inflator with the holding section such that the leading end region of the inflator is disposed inside the airbag whereas the root end region of the inflator protrudes from the insert opening of the airbag,
   wherein the flap member entirely covers the insert opening of the bag body as flatly unfolded, the flap member includes a leading edge which is disposed towards the leading end region of the inflator, and is joined to the bag body, with a continuous seam, by a circumferential edge of the flap member except the leading edge, the flap member covering the inflator as held by the holding section of the retainer;
   wherein the holding section of the retainer comprises:
      an opening-side tube section that is disposed in a vicinity of the insert opening of the airbag and that extends from the bottom region of the holding section and holds the inflator therein; and
      an open region that is formed at an area of a periphery of the opening-side tube section distant from the bottom region of the holding section, and that exposes an outer periphery of the inflator as set in the opening-side tube section towards the flap member;
   wherein the leading edge of the flap member is located at a position to be pressed against the outer periphery of the inflator via the open region of the retainer at airbag deployment;
   wherein:
      the insert opening of the airbag is composed of at least one slit and the retainer includes a retaining pawl that is formed at an end of the opening-side tube section disposed towards the insert opening of the airbag, and that protrudes from the slit and is disposed outside of the bag body in order to be engaged with a periphery of the insert opening; and
   wherein:
      the at least one slit comprises a plurality of slits; and
      one or more regions among the slits are folded inward and brought into contact with the outer periphery of the inflator.

2. The airbag device of claim 1, wherein the seam is formed in such a manner that an unsewn region is left between the leading edge of the flap member and a terminal of the seam disposed towards the leading edge, and in such a manner that a position of the terminal in an axial direction of the inflator falls within an area of the open region of the retainer.

3. The airbag device of claim 1 adapted to be used for knee protection, wherein:
   the airbag and the inflator are adapted to be stored in a case that includes a bottom wall which is arranged vertically on the vehicle and a generally tubular circumferential wall which extends rearward from a circumferential edge of the bottom wall; and the airbag and the inflator are adapted to be mounted on the bottom wall of the case.

\* \* \* \* \*